CODE COMMUNICATION SYSTEMS

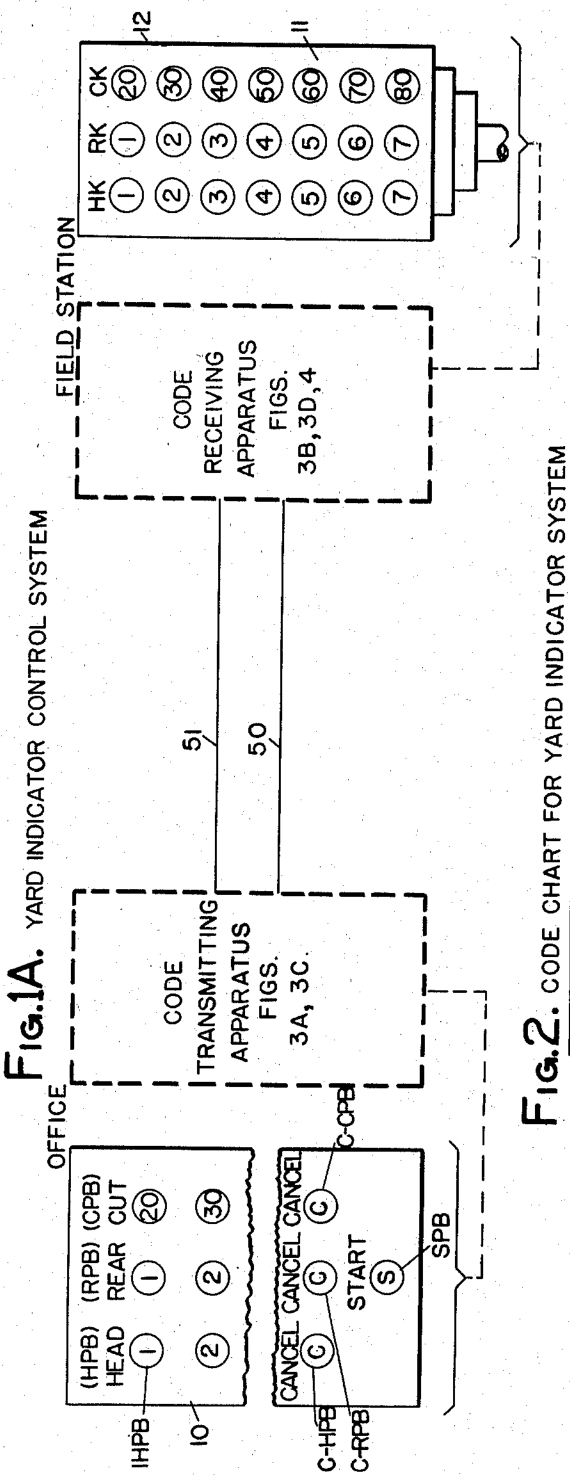
FIG. 1A. YARD INDICATOR CONTROL SYSTEM
FIG. 2. CODE CHART FOR YARD INDICATOR SYSTEM
M=MARK
S=SPACE
| FUNCTION | STEP 1 | 2 | 3 | 4 | 5 | 6 | 7 | 8 | 9 | 10 |
|---|---|---|---|---|---|---|---|---|---|---|
| HEAD-TRACK 1 | | M | M | S | | | | | | |
| REAR-TRACK 1 | | | | | M | M | S | | | |
| CUT-CAR 20 | | | | | | | | M | M | S |
| HEAD-TRACK 2 | | S | M | M | | | | | | |
| REAR-TRACK 2 | | | | | S | M | M | | | |
| CUT-CAR 30 | | | | | | | | S | M | M |
INVENTORS
N.B. COLEY, T.J. JUDGE
AND R.F. ALBRIGHTON
BY Forest B. Hitchcock
THEIR ATTORNEY INVENTORS
N.B. COLEY, T. J. JUDGE
AND R.F. ALBRIGHTON
BY Forest B. Hitchcock
THEIR ATTORNEY Jan. 13, 1959 N. B. COLEY ET AL 2,868,962

Filed Feb. 27, 1953 13 Sheets-Sheet 3

*INVENTORS*
N.B.COLEY, T.J.JUDGE
AND R.F.ALBRIGHTON
BY Forest B. Hitchcock
THEIR ATTORNEY Jan. 13, 1959 N. B. COLEY ET AL 2,868,962

CODE COMMUNICATION SYSTEMS

Filed Feb. 27, 1953 13 Sheets-Sheet 4

*INVENTORS*
N.B. COLEY, T.J. JUDGE
AND R.F. ALBRIGHTON
BY Forest B. Hitchcock
THEIR ATTORNEY

CODE COMMUNICATION SYSTEMS

Filed Feb. 27, 1953 13 Sheets-Sheet 5

INVENTORS
N.B. COLEY, T.J.JUDGE
AND R.F.ALBRIGHTON
BY Forest B. Hitchcock
THEIR ATTORNEY Jan. 13, 1959 N. B. COLEY ET AL 2,868,962

CODE COMMUNICATION SYSTEMS

Filed Feb. 27, 1953 13 Sheets-Sheet 6

INVENTORS
N.B. COLEY, T.J. JUDGE
AND R.F. ALBRIGHTON
BY Forest B. Hitchcock
THEIR ATTORNEY INVENTORS
N.B. COLEY, T.J. JUDGE
AND R.F. ALBRIGHTON
BY Forest B. Hitchcock
THEIR ATTORNEY INVENTORS
N.B.COLEY, T.J.JUDGE
AND R.F.ALBRIGHTON
BY Forest B. Hitchcock
THEIR ATTORNEY INVENTORS
N.B. COLEY, T.J. JUDGE
AND R.F. ALBRIGHTON
BY Forest B. Hitchcock
THEIR ATTORNEY INVENTORS
N.B. COLEY, T.J. JUDGE
AND R.F. ALBRIGHTON
BY Forest B. Hitchcock
THEIR ATTORNEY

*INVENTORS*
N.B. COLEY, T.J. JUDGE
AND R.F. ALBRIGHTON
BY Forest B. Hitchcock
THEIR ATTORNEY INVENTORS
N.B. COLEY, T.J. JUDGE
AND R.F. ALBRIGHTON
BY Forest B. Hitchcock
THEIR ATTORNEY INVENTORS
N. B. COLEY, T. J. JUDGE
AND R. F. ALBRIGHTON
BY Forest B. Hitchcock
THEIR ATTORNEY

United States Patent Office 2,868,962
Patented Jan. 13, 1959

2,868,962

CODE COMMUNICATION SYSTEMS

Nelson B. Coley, Thomas J. Judge, and Reginald F. Albrighton, Rochester, N. Y., assignors to General Railway Signal Company, Rochester, N. Y.

Application February 27, 1953, Serial No. 339,398

19 Claims. (Cl. 246—5)

This invention relates to code communication systems, and it more particularly pertains to a code communication system having the respective code elements counted by stepping relay banks.

When a relatively large number of controls for respective devices are to be communicated from a transmitting station to a remote receiving station, these controls are generally transmitted by distinctive multiple element codes. In order to decode these multiple element codes at the receiving station, a bank of decoding relays is generally required in addition to the bank of stepping relays used in counting the code elements, so that the reception of the respective elements is stored until the entire code is received. Then an execution circuit is closed to control respective devices in accordance with the respective codes received.

According to the system provided by the present invention, the code communication system is adapted to communicate a large number of distinctive controls by distinctive codes without requiring a bank of decoding relays at the receiving station for decoding the respective codes as they are received.

This is possible because the stepping relay bank at the receiving station is made to both count the respective steps during each cycle of operation of the code communication system and store the reception of the respective elements of the codes as they are received during the respective steps so that the execution of the code can be made upon the completion of the code. It is therefore provided, according to the present invention, that the stepping relays are first actuated to count successively the respective steps of a cycle of operation of the code communication system, and each of the stepping relays is distinctively conditioned by being selectively actuated or not actuated for a second time while the next subsequent step is taken, dependent upon the code element being received during such subsequent step. When thus actuated for a second time during the cycle of operation of the code communication system, each of the stepping relays is maintained in this actuated position until the reception of the code is completed, after which the execution of the code is rendered effective to control the particular device or devices for which the code is intended.

When the application of a communication system of this nature is in the control of a yard indicator signal from a remote transmitting station, the actuation of push buttons or similar manually operable devices at the transmitting station sets up, or designates, the respective codes for transmission, and the receiving apparatus for the control of the yard indicator signal is responsive to the code in such a manner as to provide for decoding by the stepping relays, these stepping relays being maintained in their positions to which they are operated in response to the code until the next subsequent control code is communicated from the transmitting station.

Another condition under which the code communication system provided by the present invention is applicable is in the communication of switch and signal controls from a control office to a remote field station, wherein the stepping relays are maintained in their actuated positions in accordance with the code received until the end of the cycle of operation, at which time suitable application relays are conditioned by the momentary energization of an execution circuit.

The communication system provided by the present invention is also applicable where several different groups of indications are to be communicated from a transmitting to a receiving station during separate cycles of operation, each group of indications being identified by a distinctive station registration code, and the decoding at the receiving station of the station registration code being accomplished by the selective actuation of the stepping relays after their respective counting functions have been fulfilled, thus identifying the particular groups of indications being received so as to select the energization of a particular station relay to in turn direct the elements received on the remaining steps toward the scanning of indicating devices belonging to the group identified by the station relay that has been actuated.

An object of the present invention is to use the same stepping relays at a receiving station in a code communication system for decoding as for counting the respective steps during a cycle of operation of the code communication system.

Another object of the present invention is to maintain the last decoding circuit established in a code communication system until the next control is transmitted.

Other objects, purposes, and characteristic features of the present invention will be in part obvious from the accompanying drawings and in part pointed out as the description of the invention progresses. In describing the invention in detail reference is made to the accompanying drawings in which corresponding parts are identified by similar reference characters, and in which:

Fig. 1A illustrates a yard indicator control system in block diagram form in which system the manual designation of the desired controls on a push-button control panel are transmitted over a code type communication system to control the indications given by a yard indicator type of signal;

Fig. 2 is a partial code chart for the codes employed in the yard indicator control system of Fig. 1A;

Figure 1B:
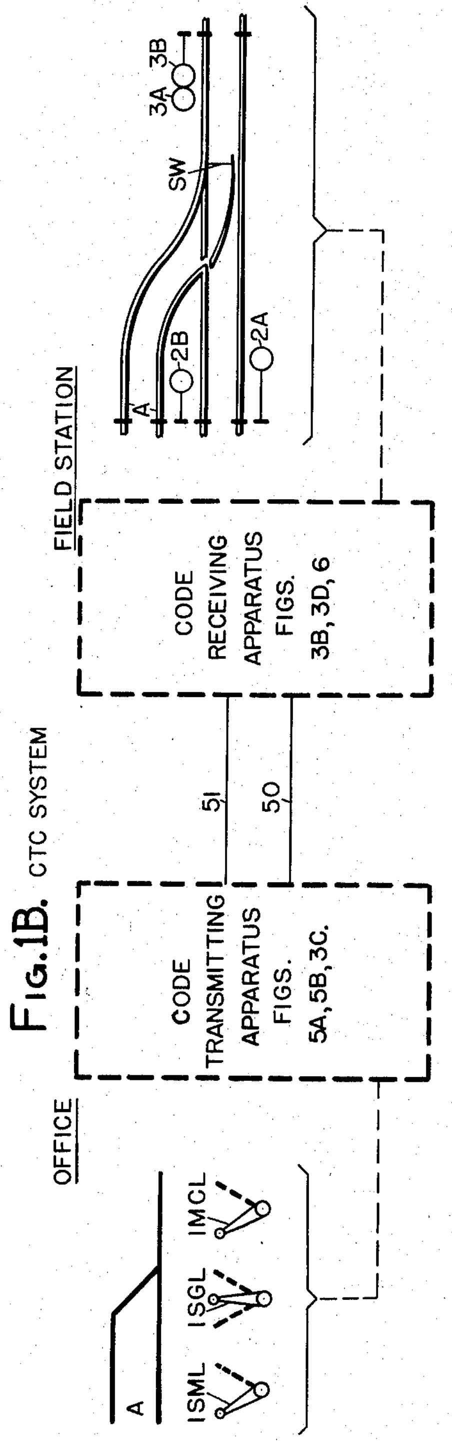
Fig. 1B illustrates a centralized traffic control system in block diagram form in which system the manual designation of the desired controls on a panel with switch and signal levers and a miniature track diagram are transmitted over a code type communication system to control the switch and signals of an actual track layout in the field.
Figure 1C:
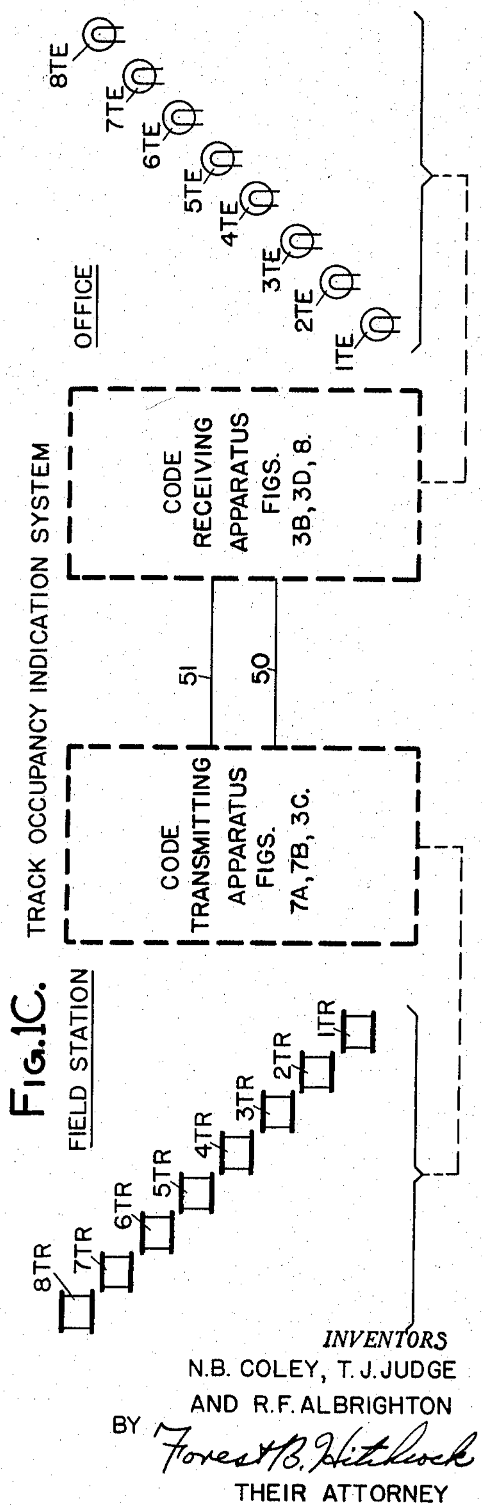
Fig. 1C illustrates a track occupancy indication system in block diagram form in which system the conditions of a plurality of track relays in the field are transmitted over a code type communication system to be indicated on a display panel in a central office.
Figure 3A:
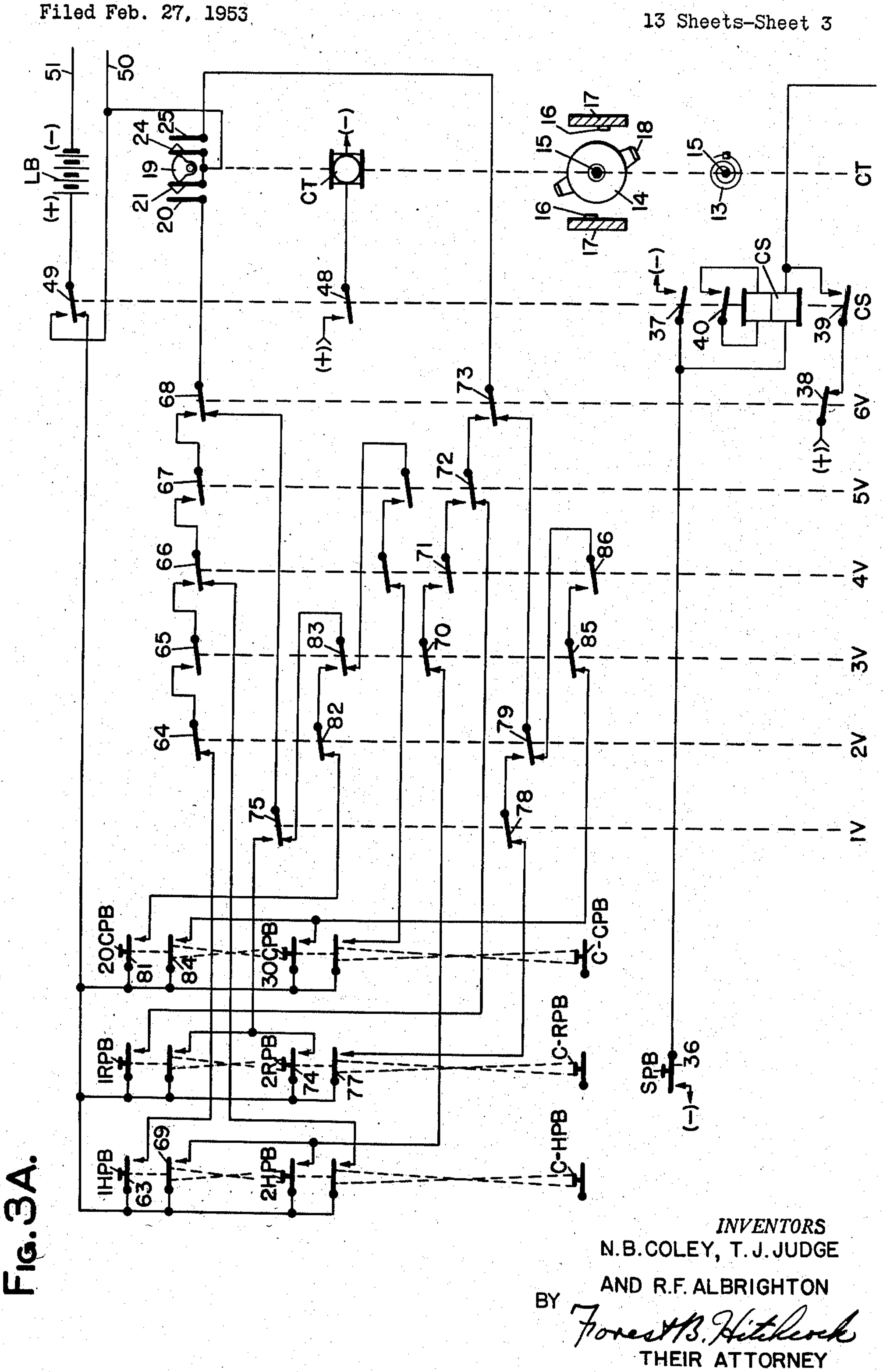
Figure 3B:
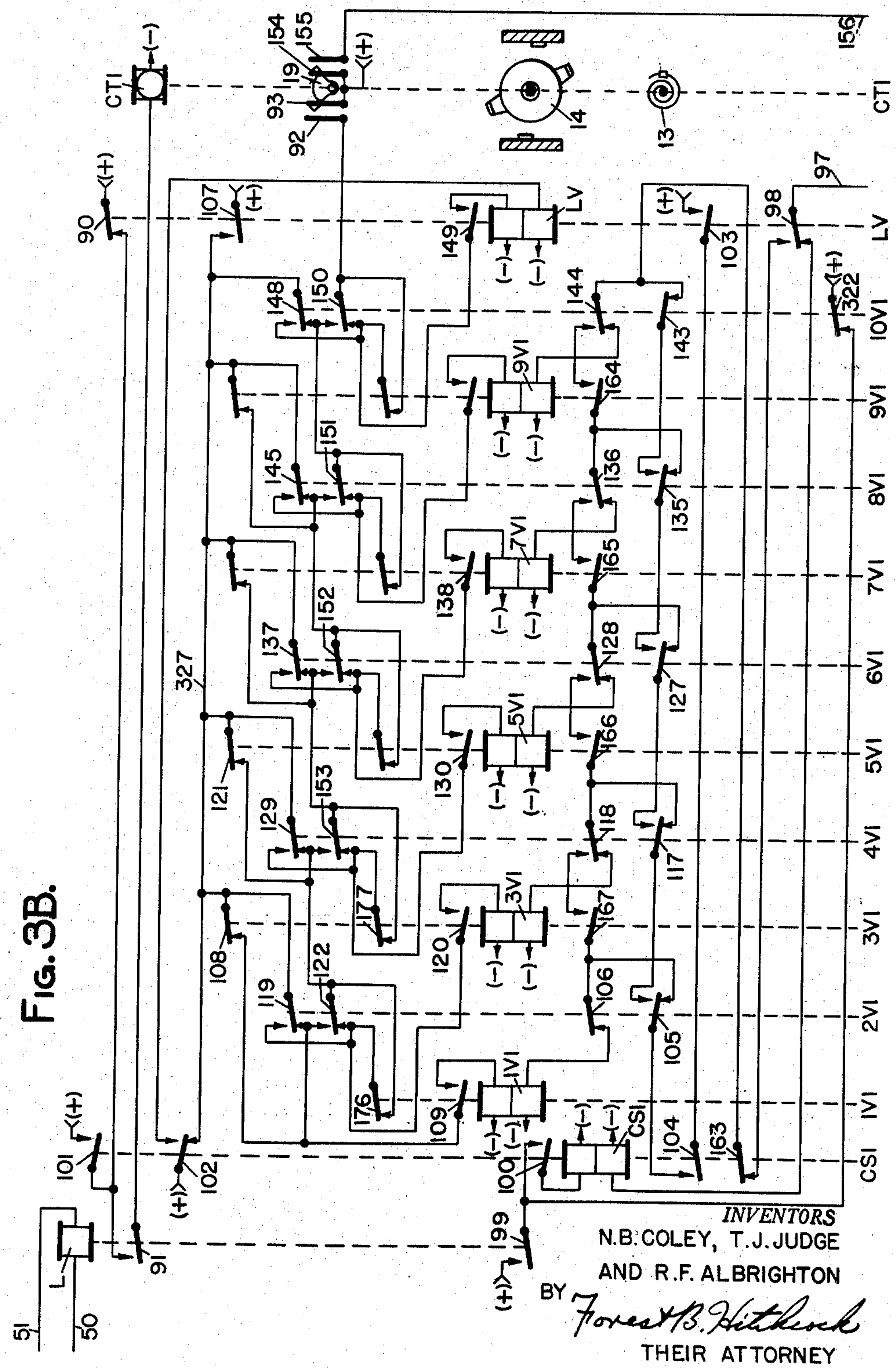
Figure 3C:
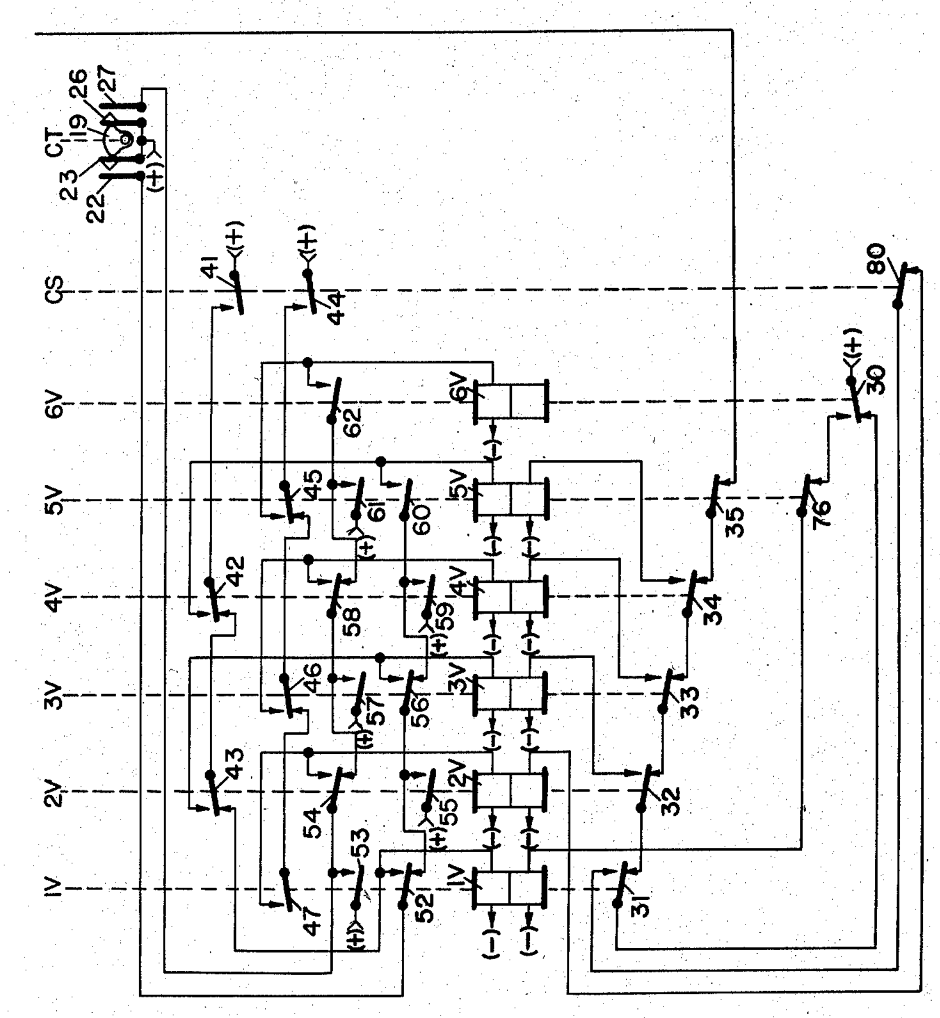
Figure 3D:
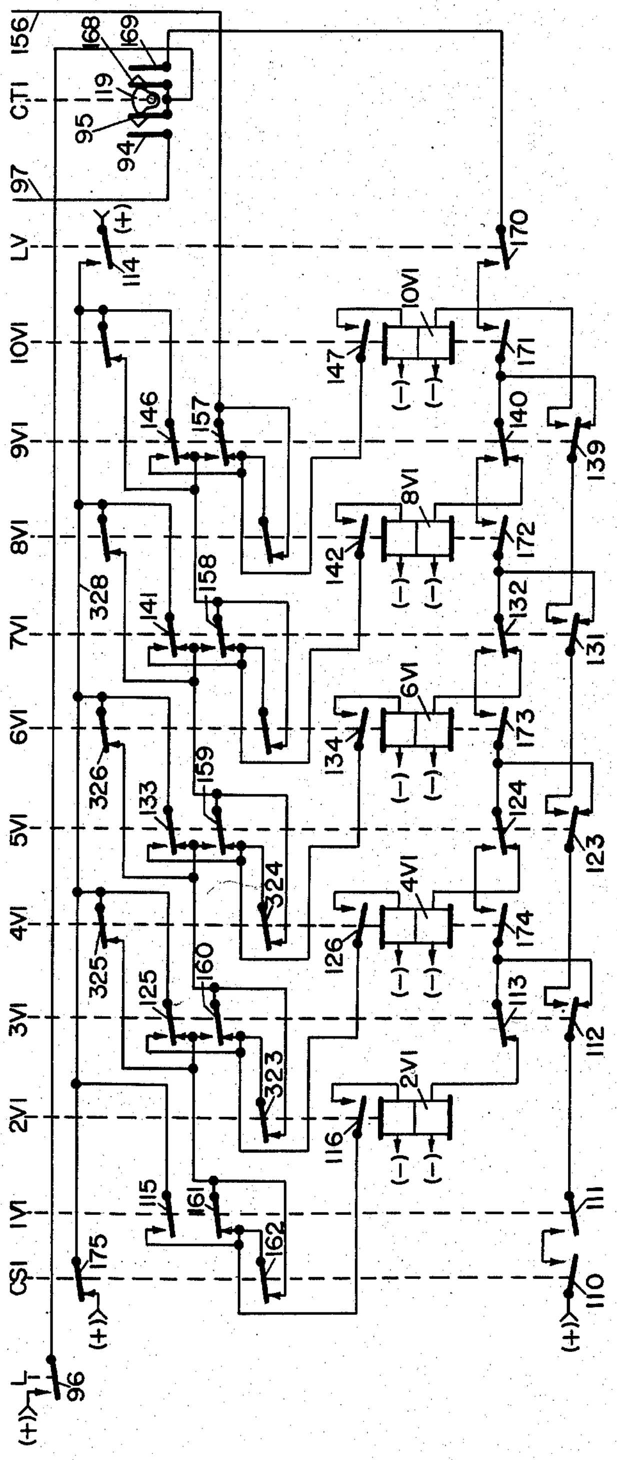
Figure 4:
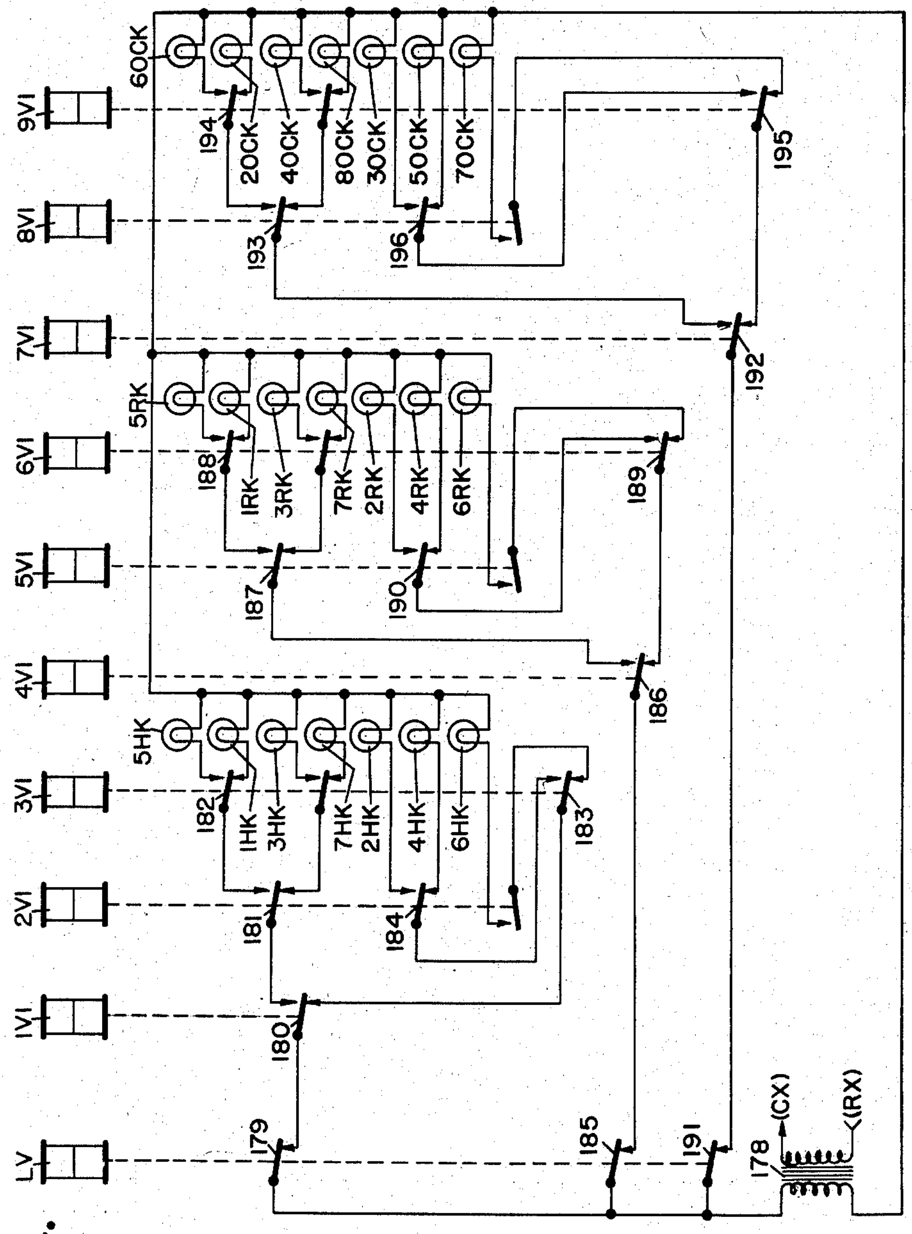
Figure 5A:
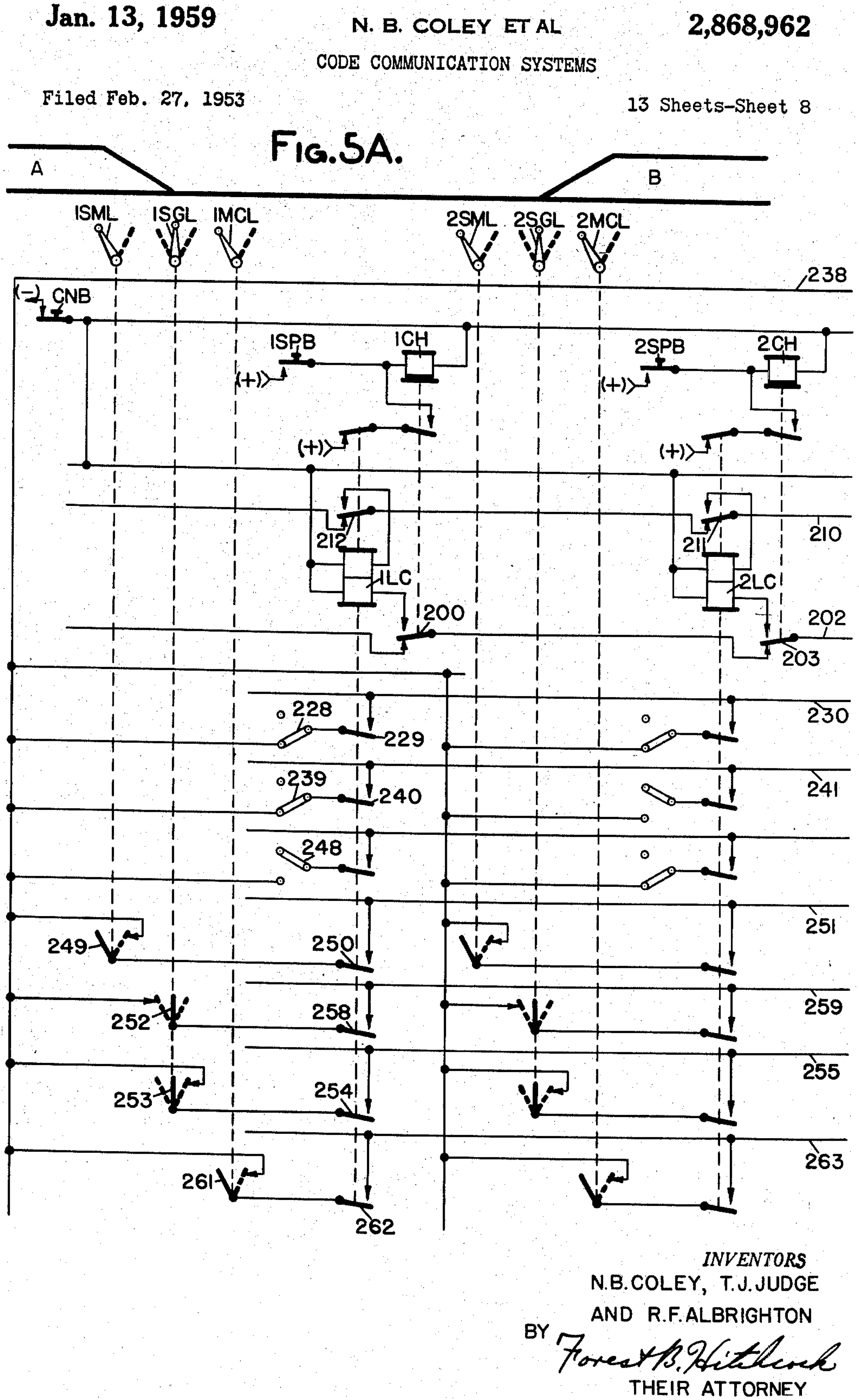
Figure 5B:
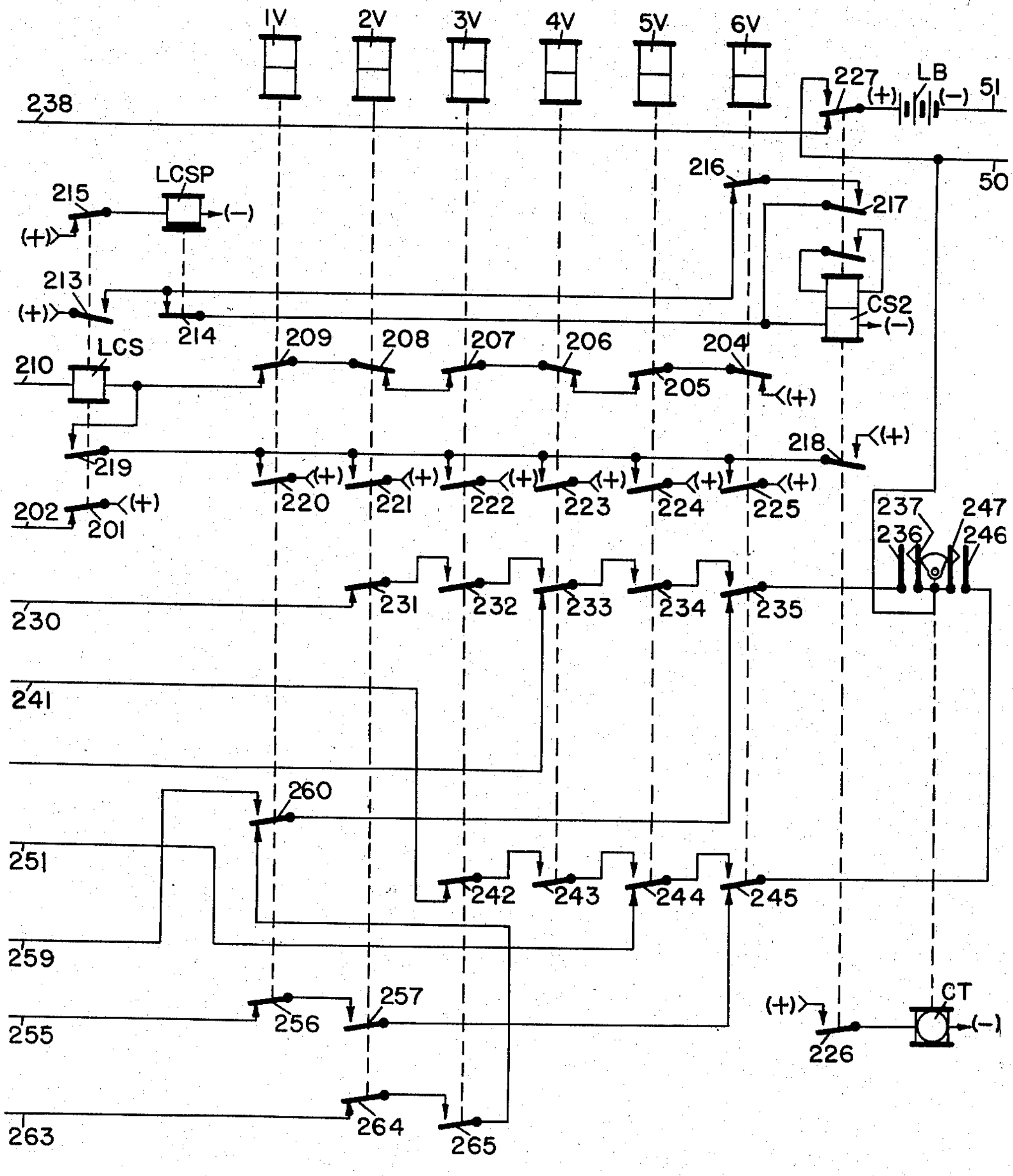
Figure 6:
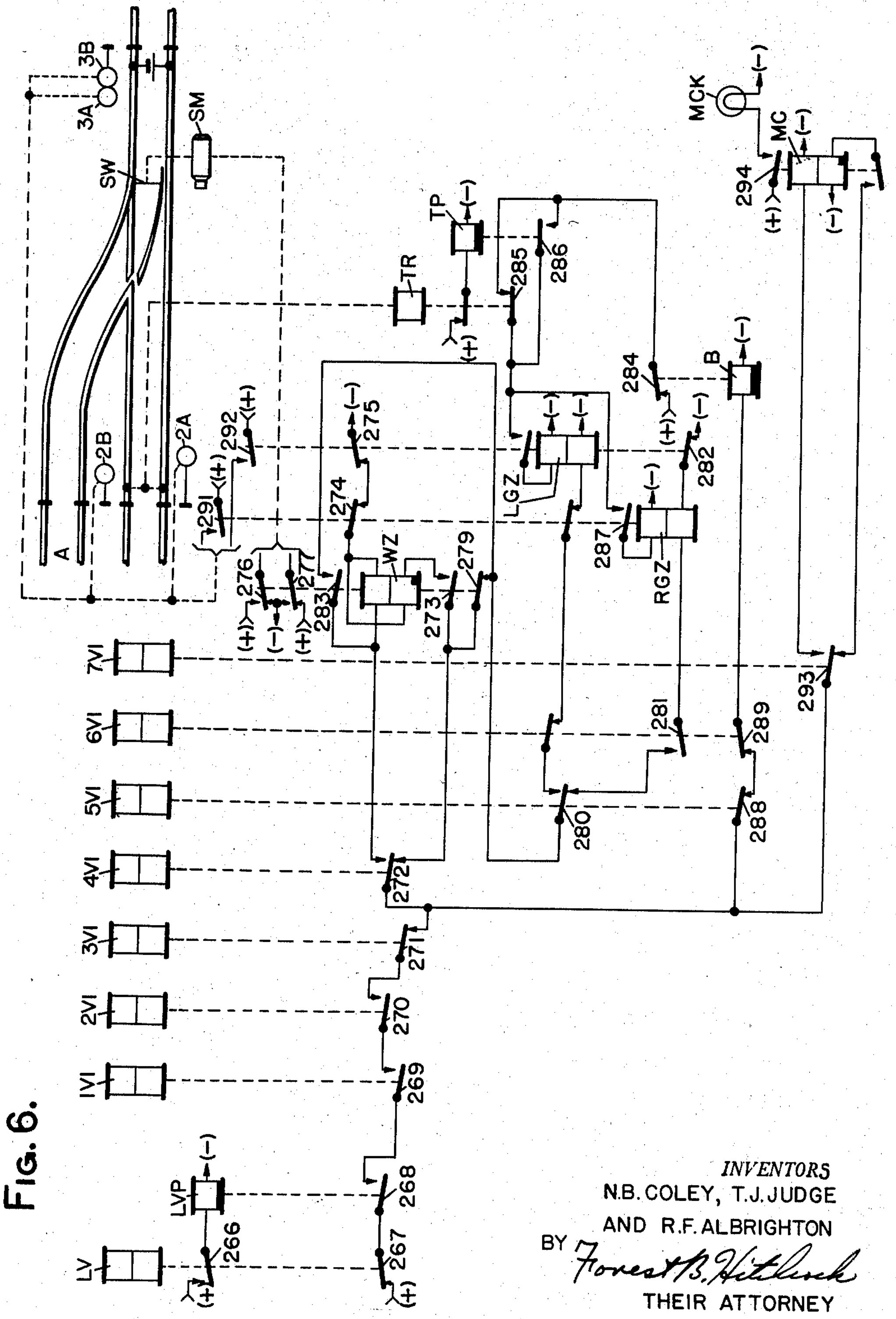
Figure 7A:
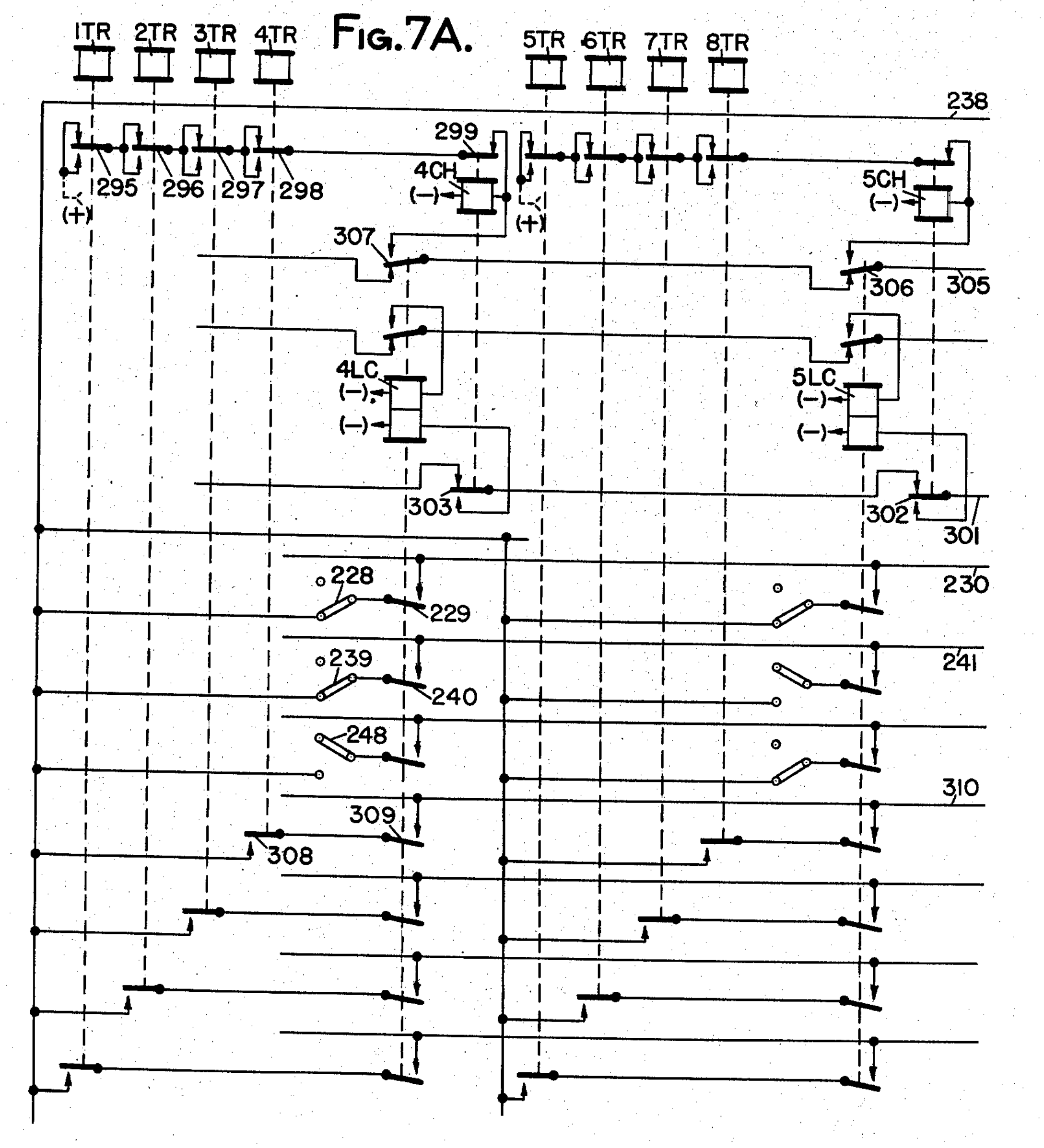
Figure 7B:
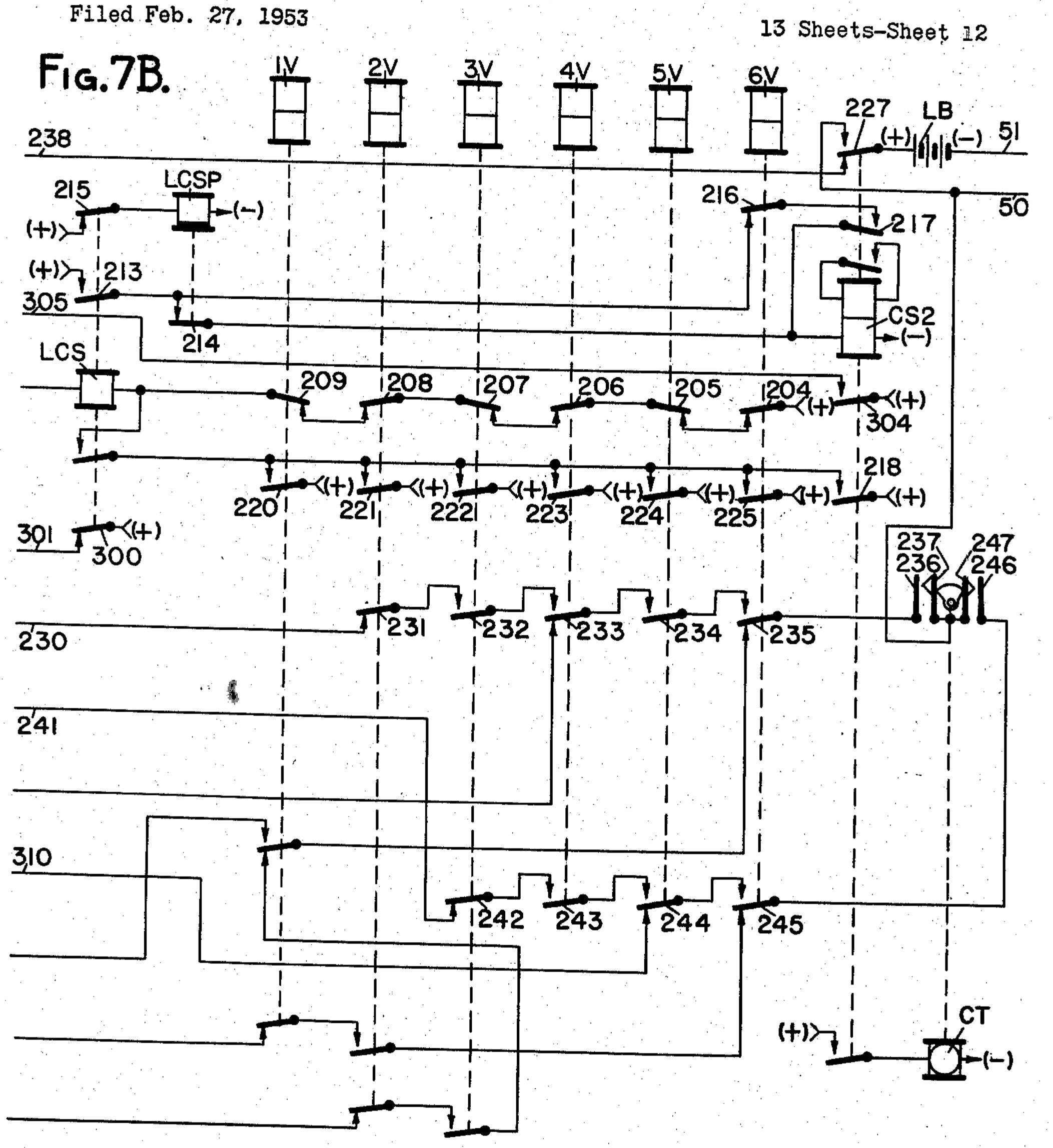
Figure 8:
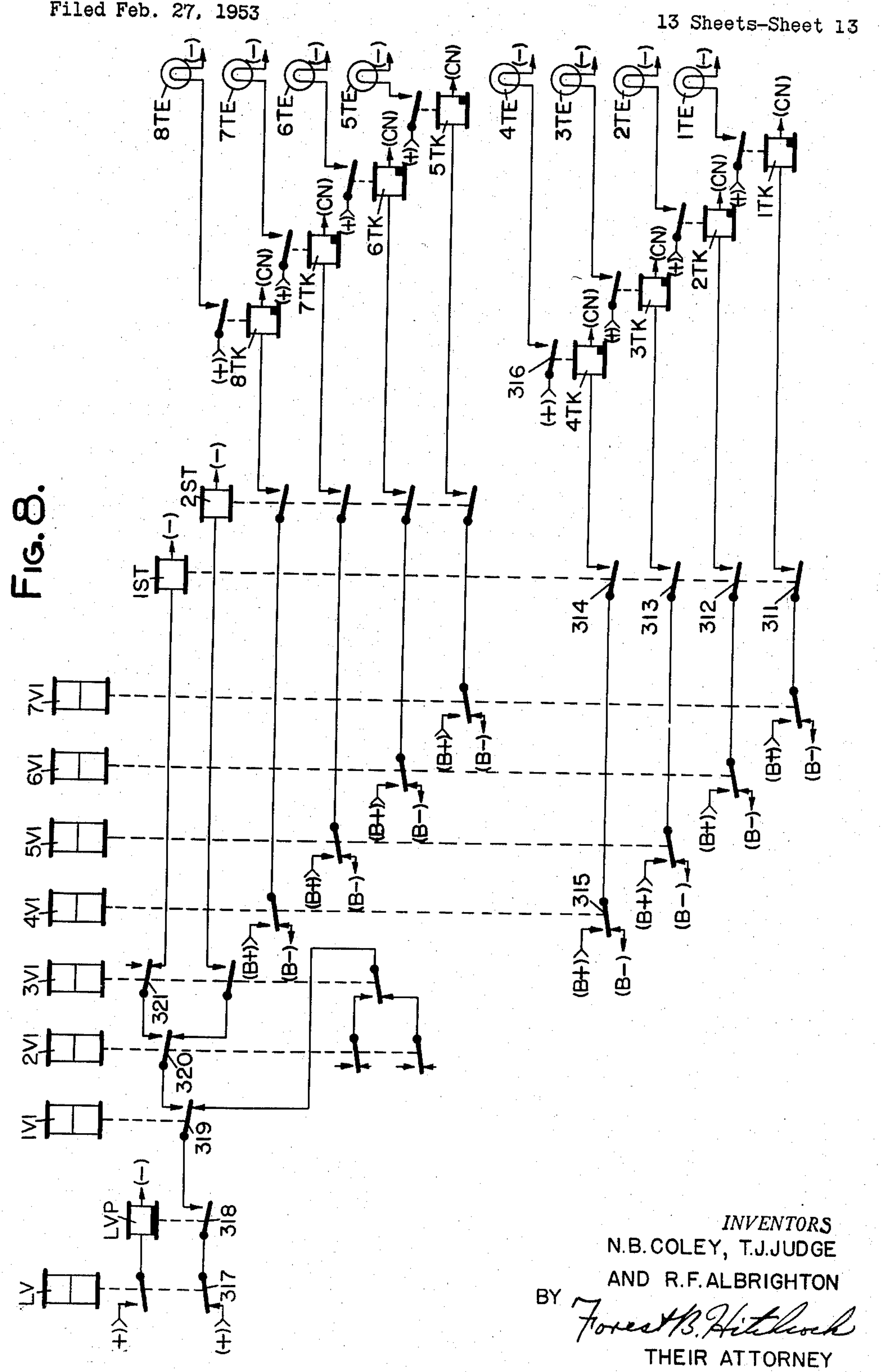

Figs. 3A and 3B when placed side by side and above Figs. 3C and 3D, respectively, and taken with Fig. 4 illustrates one embodiment of the yard indicator control system provided by the present invention as indicated in the diagram of Fig. 1A;

Fig. 4 illustrates execution circuits for the control of the yard indicator lamps of the signal illustrated in Fig. 1A;

Figs. 5A and 5B located side by side illustrate a code transmitting circuit organization which should be substituted for the circuits of Fig. 3A to provide a centralized traffic control system as indicated in Fig. 1B;

Fig. 6 illustrates the execution circuits for the control of switches and signals which should be substituted for the execution circuits of Fig. 4 to provide the centralized traffic control system as indicated in Fig. 1B;

Figs. 7A and 7B located side by side illustrate a track indication code transmitting circuit organization which may be substituted for Fig. 3A to provide the track occupancy indication system indicated in Fig. 1C; and Fig. 8 illustrates the execution circuits for track indication registration which may be substituted for the execution circuits of Fig. 4 to provide a track occupancy indication system indicated in Fig. 1C.

The organization of the circuits in the drawings is according to conventional schematic practice, the organization of the drawings being such as to simplify the disclosure as to the principles of operation, rather than illustrating specifically the organization and arrangement of parts that may be employed in the practice of the present invention. The symbols (+) and (−) have been used to indicate connections to the respective positive and negative terminals of suitable batteries or other sources of direct current, the symbol (B+) and (B−) being used to indicate the respective connections to the positive and negative terminals of a battery having a center tap designated as (CN), and the symbols (RX) and (CX) have been used to indicate connection to a suitable source of alternating current.

*Apparatus Figs. 1A, 3A, 3B, 3C, 3D, and 4*

With reference to Fig. 1A, a control panel 10 is illustrated for governing a yard indicator signal from a remote point such as at the office of a yard attendant. Disposed on the control panel 10 are three vertical rows of locking push buttons PB, or keys, the buttons PB of each row being interlocked, as is illustrated by the dotted lines of Fig. 3A, so that the actuation of a button in one of these rows provides that the button is mechanically locked in its actuated position until the actuation of any other button in that row. That is, the actuation of any button in a vertical row of buttons (except the start button SPB) is effective to restore the button previously operated, while it is retained in its operated position. The left-hand vertical row of push buttons HPB has been provided for the designation of the track in which the head end of a train is to be stored. The center row of push buttons RPB is used for designation of the track in which the rear end of a train is to be stored, and the right-hand vertical row of push buttons CPB is used for designation of the particular point in a train where a cut is to be made so that the head and rear ends of a train can be stored on different tracks.

In accordance with this organization, the number of push buttons PB provided in any one of the three vertical rows is dependent upon the number of tracks in the yard for which storage is to be indicated by a yard indicator signal. The numbers appearing on the face of the buttons HPB and RPB of the respective left-hand and center rows as illustrated in Fig. 1A are indicative of the respective tracks with which these buttons are associated. With reference to the right-hand vertical row of push buttons CPB, the number appearing on the face of the button is indicative of the particular number of cars counted from the front of the train at which a cut is to be made, with the head and rear ends of the trains being designated for specific tracks in accordance with the actuation of buttons HPB and RPB in the left-hand and center rows respectively.

With reference to Fig. 1A, cancel buttons C–HPB, C–RPB, and C–CPB are provided as the bottom buttons (start button SPB excepted) in the respective vertical rows for the purpose of cancellation. Each of these buttons has the letter C on its face, and when actuated is effective to restore any button that may be locked in its depressed position in the associated row; but the cancel buttons make no contact selections.

A start button SPB is illustrated in Fig. 1A as being disposed below the cancel button C–RPB in the center vertical row of buttons. This start button is not interlocked with any of the other buttons but is merely momentarily actuated and self restoring as a means for initiating the communication by code of controls for the yard indicator signal in accordance with tracks designated by the actuation of the above described buttons provided for that purpose.

With reference to Fig 1A, a yard indicator signal is illustrated wherein respective indicator lamps K are disposed for the various tracks in a panel 11 on the face of the signal 12, the indicator lamps K being arranged comparable to the arrangement of the push buttons PB on the control panel of Fig. 1A. A suitable structure for a yard indicator signal of this nature is disclosed in the patent to Paul M. Gault, No. 1,875,587, dated September 6, 1932. The yard indicator signal 12 is preferably located along beside the track upon entrance to a railway yard, while the yard attendant's office may be at the opposite end of the yard.

The code communication apparatus for the transmission of codes from the yard attendant's office over a two-wire circuit to the yard indicator signal station comprises in addition to the push buttons as above described, a cycle start relay CS, a bank of stepping relays 1V to 6V inclusive, a code oscillator CT and a line battery LB (see Figs. 3A and 3C).

The code oscillator CT is preferably a torsional pendulum timing device effective to determine the rate of operation of the stepping relays and to serve as a half-step device in the control of the stepping bank. The oscillator CT as employed in this embodiment of the present invention, is a normally deenergized timing device having a torsional spring 13 and a pendulum 14 on a common shaft 15. The structure of this oscillator is similar to that of the oscillator disclosed in the patent to O. S. Field, No. 2,351,588, dated June 20, 1944, except that stops 16 are provided in association with the electromagnetic structure 17 so that the energization of the winding of the oscillator CT causes an armature 18 to be actuated against the stops 16 and thus condition the oscillator for free swinging operation upon removal of energy from the oscillator winding. The shaft 15 of the oscillator also carries suitable cams 19 for operation of respective left and right groups of contacts. The group of contact fingers 20 and 21 (see Fig. 3A) and 22 and 23 (see Fig. 3C) shown to the left of the cam 19 are closed when the pendulum 14 of the oscillator CT is in a position rotated counter-clockwise from its normal deenergized center position with respect to spring bias; and similarly the contact fingers 24 and 25 (see Fig. 3A) and fingers 26 and 27 (see Fig. 3C) shown to the right of the cam 19 are closed whenever the pendulum 14 is rotated clockwise from its normal position in which it is biased by the spring 15 when the winding is deenergized.

At the field station or trackway location (see Figs. 3B, 3D, and 4), a similar stepper organization is provided for the reception and decoding of codes transmitted from the yard office. This field stepper comprises stepping relays 1V1 to 10V1 inclusive, and a last step relay LV. A cycle start relay CS1 is provided at the field station for the initiation of the stepper, and the operation of the stepper is governed locally by an oscillator CT1 comparable to the oscillator CT that has been described as being employed at the control office.

With reference to Fig. 4, respective decoding circuit organizations are provided for governing yard indicator signal lamps K of signal 12.

*Apparatus Figs. 5A, 5B and 6*

The apparatus of Figs. 5A and 5B is provided for the modification of the system for transmission of controls from a control office so as to transmit railway switch and signal controls rather than the yard indicator controls as is illustrated in Fig. 3A. Thus, the apparatus of Figs. 5A and 5B comprises switch and signal position designating means in the form of manually operable levers SML and SGL respectively, and a lever MCL for each station is provided for the manual designation of a maintainer's call for transmission to an associated field station. Conventional change relays CH are provided for the respective associated field stations, together with code determining relays LC, and a relay LCS for preventing interference with a cycle in progress when new controls are designated for transmission. It is assumed that the stepper relays 1V to 6V inclusive are controlled as shown in Figs. 3C and 5B, but the start of the cycle is preferably provided by relay CS2 which has been arranged to start the cycle automatically upon the picking up of the relay LCS. A slow drop away relay LSCP is provided for opening the pickup circuit of the cycle start CS2, and it is to be understood that the same oscillator CT is employed for governing the operation of the stepping relays V as has been described for the form of the invention illustrated in Figs. 3A and 3C.

With reference to Fig. 6, switch and signal control application relays are shown as being operable in response to switch and signal control codes received and decoded by the stepping relays 1V1 to 7V1 respectively, the operation of these relays being the same as that which is specifically illustrated in Figs. 3B and 3D. A switch control application relay WZ (see Fig. 6) is illustrated as being of the magnetic stick type, and left and right signal control application relays LGZ and RGZ are provided, together with a stop control relay B for the control of the signals of a typical track layout. The track relay TR and the track repeater relay TP are associated with the stick control of the signal application relays LGZ and RGZ. A relay MC is provided for the reception of a maintainer's call, this relay being illustrated as being of the magnetic stick type so that when momentarily energized with one polarity or another it is driven to a corresponding position and maintained in that position to maintain the control of an indicator lamp MCK in accordance with the maintainer's call control as communicated.

*Apparatus Figs. 7A, 7B, and 8*

The apparatus of Figs. 7A and 7B is for the modification of the system disclosed in Fig. 3A to permit the transmission of different groups of indications from a transmitting station to a remote receiving station. Thus, the apparatus according to Figs. 7A and 7B includes normally energized change relays CH and associated relays LC for the respective groups of indications to be transmitted. Relays LCS, LCSP, and CS2 are controlled the same and for the same purposes as relays identified by corresponding letter reference characters in Figs. 5A and 5B.

With reference to Fig. 8, a magnetic stick indicator relay TK and an associated indicator lamp TE are provided for each indication to be received. The stepping is assumed to be accomplished by the same stepping relays 1V1 to 7V1 inclusive, and the relay LV, as is fully disclosed in Figs. 3B and 3D. The slow drop away relay LVP is provided to terminate the execution period for the control of the magnetic stick indication relays TK at the end of a cycle of operation of the code communication system.

OPERATION

*General*

In considering the mode of operation for the control of the yard indicator signal 12, reference is made to Figs. 1A, 2, 3A, 3B, 3C, 3D, and 4. To designate the yard signal controls for transmission, a yard attendant actuates push buttons PB in respective vertical rows (see Figs. 1A or 3A) to designate tracks for the respective sections of a train in a manner which has been described. He then actuates the start button SPB.

With reference to Fig. 3A, the actuation of the start button SPB causes the momentary picking up of the cycle start relay CS, and relay CS when picked up causes the picking up of the stepping relays V and causes the energization of the oscillator CT.

After the stepping relays have all been picked up, relay CS is dropped away, and the oscillator CT thus permits its armature to swing free to mark off the time intervals for the respective steps. A step is taken by a stepping relay V of the stepping bank each time the oscillator CT swings through center until the entire complement of eleven steps has been taken, relays 1V to 5V inclusive being used over a second time in the stepping to a full complement of eleven steps with six relays.

Contacts of the stepper relays, together with contacts of the oscillator CT form the respective channels for transmission of the respective code elements, while contacts of the actuated push buttons in the respective vertical rows determine the respective elements transmitted as being selectively "mark" or "space" characters.

At the field station (see Figs. 3B and 3D), the energization of the line circuit causes the initial energization of the oscillator CT1, which in turn allow the cycle start relay CS1 to be picked up. The picking up of the cycle start relay CS1 conditions the field station for operation by picking up stepping relays 1V1 through 10V1 immediately following the picking up of the relay LV. The line circuit is deenergized at the end of the conditioning period which releases the cycle start relay CS1 and the oscillator CT1 to cause the stepping to take place in accordance with the free swinging of the oscillator CT. A step is taken each time that the oscillator passes through center in its operation until all steps have been taken by the dropping away of the stepping relays respectively.

With reference to Fig. 4, after the relay LV (corresponding to the last step) has been dropped away, circuits are closed for the selective energization of the lamps of signal 12 (see Figs. 1A and 4) in accordance with the code that has been received. This manner of executing the code for the selective control of the lamps is provided because the code is not fully determined until all the steps have been taken. In brief, when any particular step is taken by the release of a stepping relay, the next preceding relay is picked up or is left deenergized depending upon the picked up or dropped away position respectively of the line relay L for that particular step. If any stepping relay is picked up, it is maintained energized by stick circuit means until another code is received during another cycle of operation.

Thus, upon the code communication of the control being completed, the particular signal indication which has been transmitted is maintained set up in the energization of the selected indicator lamps of Fig. 4; and at the control office, the buttons are maintained in their locked positions as an indication to the yard attendant as to the last yard indication which he has set up.

*Transmission of yard indicator codes*

To consider specifically the mode of operation upon the transmission of yard indicator codes, it will be assumed that the buttons 1HPB, 2RPB, and 20CPB have been actuated for designation of the head end of a train to be put in track 1, the rear end of the train to be put in track 2, and the train to be cut at the 20th car. After the actuation of these buttons, it will be assumed that the yard attendant actuates the start button SPB (see Fig. 3A).

Upon the actuation of the button SPB, the relay CS is picked up by the energization of a circuit extending from (+) including back contacts 30, 31, 32, 33, 34, and 35 of relays 6V, 1V, 2V, 3V, 4V, and 5V respectively, lower winding of relay CS, and contact 36 of button SPB in its depressed position. The picking up of relay CS establishes a stick circuit at front contact 37 to shunt contact 36 of the start button SPB out of the circuit just described, and the relay CS is maintained picked up until all of the stepping relays have been picked up by a stick circuit including back contact 38 of relay 6V, and is shunted by its front contact 40 so as to make this relay CS slow in releasing for reasons later to be explained.

Upon the picking up of relay CS, the relay 1V is picked up by the energization of a circuit extending from (+) including front contact 41 of relay CS, back contact 42 of relay 4V, back contact 43 of relay 2V, and upper winding of relay 1V, to (−). The picking up of relay 1V establishes a pick up circuit for relay 2V extending through front contact 44 of relay CS, back contact 45 of relay 5V, back contact 46 of relay 3V, front contact 47 of relay 1V, and upperwinding of relay 2V, to (−). Relay 3V is picked up in response to the picking up of relay 2V by the energization of a circuit extending through front contact 41 of relay CS, back contact 42 of relay 4V, front contact 43 of relay 2V, and upperwinding of relay 3V. The relay 4V is in turn picked up through front contact 44 of relay CS, back contact 45 of relay 5V, front contact 46 of relay 3V, and upper winding of relay 4V. The picking up of relay 4V causes the picking up of relay 5V by the energization of a circuit including front contact 41 of relay CS, front contact 42 of relay 4V, and upper winding of relay 5V. Relay 5V when picked up establishes a circuit for the picking up of relay 6V extending through front contact 44 of relay CS, front contact 45 of relay 5V, and upper winding of relay 6V, to (−).

The picking up of relay CS is also effective to energize the oscillator CT through front contact 48. Relay CS when picked up also initiates the conditioning of the field stepper and oscillator by reason of closure of the line circuit at front contact 49 which is maintained closed until the end of the conditioning period. The line circuit as thus closed extends from the positive terminal of the line battery LB, through front contact 49, line wire 50, line relay L at the field station, and line wire 51, to the negative terminal of the line battery LB.

As soon as the relay 6V is picked up, the relay CS is deenergized by the opening of back contact 38 of relay 6V, and thus it becomes dropped away after its slow release period and opens the line circuit at front contact 49, and also opens the circuit for the energization of the oscillator CT at front contact 48. Thus, the conditioning at the control office has been completed, and the system is initiated into its stepping operation. The deenergization of the line circuit drops the line relay L to in turn deenergize the oscillator CT1 at the field station in a manner to be hereinafter considered under the heading "Reception of yard indication codes," and thereby initiate its stepping operation in synchronism with the stepping operation at the control office which is initiated by the deenergization of the oscillator CT.

It should be noted that the stepping relays V are held in their picked up conditions by stick circuits as soon as they are picked up and these stick circuits are maintained until their respective associated steps have been taken. In other words, these stick circuits are successively deenergized, one at a time, and one for each swing of the associated oscillator CT through its center position.

Relay 1V is maintained picked up at this time by stick circuit extending from (+), including contact fingers 22 and 23 of oscillator CT which are closed with the oscillator in its energized position, front contact 52 of relay 1V, and upper winding of relay 1V, to (−). The stick circuit by which relay 2V is maintained picked up extends from (+), including front contact 53 of relay 1V, front contact 54 of relay 2V, and upper winding of relay 2V, to (−). The stick circuit for relay 3V includes front contact 55 of relay 2V, front contact 56 of relay 3V, and upper winding of relay 3V. The stick circuit for relay 4V includes front contact 57 of relay 3V, front contact 58 of relay 4V, and upper winding of relay 4V. The stick circuit for relay 5V includes front contact 59 of relay 4V, front contact 60 of relay 5V, and upper winding of relay 5V. The stick circuit for relay 6V extends through front contact 61 of relay 5V, front contact 62 of relay 6V, and upper winding of relay 6V.

When the oscillator mechanism rotates through its center position for the first time upon the deenergization of the oscillator, the contacts 22 and 23 are opened, and thus the relay 1V becomes dropped away to mark the first step. This first step is not used for the transmission of a code element because there is no prior step in the field for registering a code. Thus, during the first step, the line circuit remains open as for the transmission of a "space" code character.

The dropping away of relay 1V opens the stick circuit that has been described for relay 2V at front contact 53, but stick energy is applied to the upper winding of relay 2V through contact fingers 26 and 27 so that the relay 2V is deenergized when the oscillator CT rotates through center for the second time.

Upon the dropping away of relay 2V, a mark is transmitted by reason of the push button 1HPB being in its operated position. Thus the line circuit is energized for the mark during the second step by a circuit extending from the positive terminal of the line battery LB through back contact 49 of relay CS, contact 63 of button 1HPB, back contact 64 of relay 2V, front contacts 65, 66, 67, and 68 of relays 3V, 4V, 5V, and 6V respectively, contact fingers 20 and 21 of oscillator CT, line wire 50, line relay L, and line wire 51, to the negative terminal of the line battery LB.

The relay 3V is dropped away when the oscillator mechanism rotates through center for the third time by a similar mode of operation as has been described for the dropping away of the relay 1V, and the character transmitted during the third step is also a mark in accordance with the button 1HPB being in its operated position. The transmission of a mark during the third step is in accordance with the closure of the line circuit from the positive terminal of the line battery LB through back contact 49 of relay CS, contact 69 of button 1HPB, back contact 70 of relay 3V, front contacts 71, 72, and 73 of relays 4V, 5V, and 6V respectively, contact fingers 24 and 25 of oscillator CT, line wire 50, line relay L, and line wire 51 to the negative terminal of the line battery LB. It will be noted that the circuit described for transmission during the second step is open at this time because of the opening of contacts 20 and 21 of the oscillator CT and the dropping away of relay 3V at front contact 65; and thus in a similar manner, as the respective steps are taken, the circuits for transmission during successive periods are initially opened by the oscillator contacts and are maintained opened by the chain circuit organization of stepping contacts so that only one channel can be closed at a time during a cycle of operation for the transmission of control codes.

The code element for transmission during the fourth step is a space, and thus the line circuit is open when the fourth step is taken. The transmission during the fourth step completes the transmission of a three element code used for designation of the track 1 for the head end of the train, the code mark-mark-space having been transmitted in accordance with the button 1HPB being in its operated position.

Upon entering the fifth step, a space is transmitted because the line circuit is maintained open at that time, it being assumed that the button 2RPB is in its operated position, and in this position, the code selected for transmission during the fifth, sixth, and seventh steps respectively, is "space-mark-mark."

When the sixth step is taken, a mark is transmitted in accordance with the line circuit being closed from the positive terminal of the line battery LB, through back contact 49 of relay CS, contact 74 of button 2RPB, front contact 75 of relay 1V, back contact 68 of relay 6V, contact fingers 20 and 21 of oscillator CT, line wire 50, line relay L, and line wire 51, to the negative terminal of the line battery LB. The relay 1V is picked up at this time because of its being picked up for a second time to be used over again in counting the seventh step. The circuit by which the relay 1V has been picked up under these conditions is closed upon the dropping away of relay 5V, and extends from (+), including front contact 30 of relay 6V, back contact 76 of relay 5V, and lower winding of relay 1V, to (—). It will be noted that this pickup circuit is opened upon the dropping away of relay 6V at front contact 30, and thus the relay 1V becomes dependent upon the stick circuits that have been described for governing its release. Thus, it is the opening of the contact fingers 22 and 23 of the oscillator CT when its mechanism is rotated through center for the seventh time during the cycle that causes the dropping away of relay 1V to mark the seventh step.

The line circuit is closed during the seventh step for the transmission of a mark from the positive terminal of the line battery LB, through back contact 49 of relay CS, contact 77 of button 2RPB, back contact 78 of relay 1V, front contact 79 of relay 2V, back contact 73 of relay 6V, contact fingers 24 and 25 of oscillator CT, line wire 50, line relay L, and line wire 51, to the negative terminal of line battery LB. This completes the transmission of the "space-mark-mark" code transmitted in accordance with the actuation of the button 2RPB to designate the second track for storage of the rear end of a train.

The relay 2V is picked up for a second time during the cycle upon the dropping away of relay 6V by the energization of a circuit including back contact 30 of relay 6V, front contact 31 of relay 1V, back contact 80 of relay CS, and lower winding of relay 2V. This circuit is opened by the dropping away of relay 1V at front contact 31, and thus the relay 2V is subject to energization by the same stick circuits that have been heretofore described for this relay so that it is dropped away during the eighth step when the contacts 26 and 27 of the oscillator CT are actuated upon the mechanism of the oscillator CT rotating through center for the eighth time during the cycle of operation.

The code transmitted during the eighth, ninth, and tenth steps is in accordance with the designation of the place where the train is to be cut, which designation has been assumed to be made by the operation of the push button 20CPB. With this button in its operated position during a cycle, the code transmitted during the eighth, ninth, and tenth steps is "mark-mark-space". Thus during the eighth step, the line circuit is closed from the positive terminal of the line battery LB, through back contact 49 of relay CS, contact 81 of button 20CPB, back contact 82 of relay 2V, front contact 83 of relay 3V, back contact 75 of relay 1V, back contact 68 of relay 6V, contact fingers 20 and 21 of oscillator CT, line wire 50, line relay L, and line wire 51, to the negative terminal of the line battery LB.

The relay 3V is picked up during the seventh step so that it can be used for the ninth step by the energization of a circuit including back contact 30 of relay 6V, back contact 31 of relay 1V, front contact 32 of relay 2V, and lower winding of relay 3V. Thus the relay 3V is used for a second time in the cycle so as to count the ninth step, and to transmit a mark during the ninth step. The dropping away of relay 3V closed the line circuit from the positive terminal of the line battery LB, through back contact 49 of relay CS, contact 84 of button 20CPB, back contact 85 of relay 3V, front contact 86 of relay 4V, back contact 79 of relay 2V, back contact 73 of relay 6V, contact fingers 24 and 25 of oscillator CT, line wire 50, line relay L, and line wire 51, to the negative terminal of line battery LB.

The relay 4V is picked up for a second time when the relay 2V is dropped away by the energization of a circuit including back contact 30 of relay 6V, back contact 31 of relay 1V, back contact 32 of relay 2V, front contact 33 of relay 3V, and lower winding of relay 4V. The relay 4V when picked up is maintained picked up by its stick circuit so as to be dropped away to count the tenth step. Because of the code calling for the transmission of a space during the tenth step, the line circuit is maintained open at this time.

The eleventh and last step is in accordance with the dropping away of relay 5V, this relay having been picked up for a second time during the cycle by a circuit extending from (+), including back contact 30 of relay 6V, back contact 31, 32, 33 of relays 1V, 2V, and 3V respectively, front contact 34 of relay 4V, and lower winding of relay 5V, to (—). The eleventh step is not used for code communication purposes, and thus is always a space.

The dropping away of the relay 5V for the second time during the cycle of operation completes the operation of the stepping at the control office during the typical cycle of operation under consideration, and with all the stepping relays in their dropped away position, the further swinging of the oscillator CT is ineffective to cause any other relay operations or to cause the closing of the line circuit, therefore the apparatus at the control office is restored to its normal state of rest when the oscillator CT comes to rest in a posititon in which it is biased with respect to rotation by the spring 13.

*Reception of yard indicator codes*

Upon the picking up of the line relay L (see Fig. 3B) at the field station initially to mark the start of a cycle of operation of the code communication system, the oscillator CT1 becomes energized by a circuit including back contact 90 of relay LV, and front contact 91 of relay L. The oscillator CT1 when thus energized closes its left-hand contact fingers 92 and 93, and 94 and 95, and these contact fingers remain closed until the oscillator becomes deenergized for its free swinging operation including the rotation of the oscillator pendulum 14 through the center position in which it is biased normally by the spring 13. Oscillator CT1 is maintained energized through front contact 101 of relay CS1 and front contact 91 of relay L after relay CS1 has become picked up.

With the line relay L picked up, a pickup circuit is now closed for the relay CS1 extending through front contact 96 of relay L, contact fingers 94 and 95 of oscillator CT1, wire 97, back contact 98 of relay LV and lower winding of relay CS1. Relay CS1 when thus picked up is maintained energized as long as the relay L remains picked up by a stick circuit including front contact 99 of relay L, front contact 100 of relay CS1, and the upper winding of relay CS1. In addition, energy is applied through back contact 322 of relay 10V1 to the front contact 100 of relay CS1 so as to assure the continued energization of relay CS1 until the conditioning of the stepping relays V has been completed. Relay CS1 when picked up applies energy to the circuit for the oscillator CT1 through front contact 101 and through front contact 91 of relay L so as to maintain the oscillator CT1 energized during the conditioning period involving the picking up of the stepping relays.

Upon the picking up of relay CS1, relay LV has its lower winding energized through front contact 102. When relay LV becomes picked up, the stepping relay 1V1 is picked up by a circuit including front contact 103 of relay LV, front contact 104 of relay CS1, back contacts 105 and 106 of relay TV1, and lower winding of relay 1V1. When picked up, the relay 1V1 is maintained energized by a stick circuit extending through front contact 107 of relay LV, back contact 108 of relay 3V1, front contact 109 of relay 1V1, and upper winding of relay 1V1.

Relay 2V1 is picked up by the energization of its lower winding through front contact 110 of relay CS1, front contact 111 of relay 1V1, and back contacts 112 and 113 of relay 3V1. Relay 2V1 when thus picked up is maintained energized by a stick circuit including front contact 114 of relay LV, front contact 115 of relay 1V1, front contact 116 of relay 2V1, and upper winding of relay 2V1.

The relay 3V1 is picked up by the energization of its lower winding in response to the picking up of relay 2V1. The pickup circuit for relay 3V1 extends through front contact 103 of relay LV, front contact 104 of relay CS1, front contact 105 of relay 2V1, and back contacts 117 and 118 of relay 4V1. Relay 3V1 is maintained picked up by a stick circuit for its upper winding including front contact 107 of relay LV, front contact 119 of relay 2V1, and front contact 120 of relay 3V1.

Although the stick circuit that has been described for relay 1V1 is opened at back contact 108 by the picking up of relay 3V1, the relay 1V1 is held by a stick circuit including front contact 107 of relay LV, back contact 121 of relay 5V1, front contact 122 of relay 2V1, and front contact 109 of relay 1V1.

Relay 4V1 is picked up in response to the picking up of relay 3V1 by the energization of its lower winding through front contact 110 of relay CS1, front contact 111 of relay 1V1, front contact 112 of relay 3V1, and back contacts 123 and 124 of relay 5V1. When picked up, the relay 4V1 is maintained picked up by the energization of its upper winding in a stick circuit including front contact 114 of relay LV, front contact 125 of relay 3V1, and front contact 126 of relay 4V1.

Relay 5V1 is picked up in response to the picking up of relay 4V1 by the energization of its lower winding through front contact 103 of relay LV, front contact 104 of relay CS1, front contacts 105 and 117 of relays 2V1 and 4V1, respectively, and back contacts 127 and 128 of relay 6V1. Relay 5V1 when picked up has its upper winding energized in a stick circuit including front contact 107 of relay LV, front contact 129 of relay 4V1, and front contact 130 of relay 5V1.

Relay 6V1 is picked up in response to the picking of relay 5V1 by the energization of its lower winding through front contacts 110, 111, 112, and 123 of relays CS1, 1V1, 3V1, and 5V1, respectively, and back contacts 131 and 132 of relay 7V1. This relay when picked up has its upper winding energized by stick circuit including front contact 114 of relay LV, front contact 133 of relay 5V1, and front contact 134 of relay 6V1.

Upon the picking up of relay 6V1, relay 7V1 is picked up by the energization of its lower winding through front contacts 103, 104, 105, 117, and 127 of relays LV, CS1, 2V1, 4V1, and 6V1, respectively, and back contacts 135 and 136 of relay 8V1. This relay when picked up, has its upper winding energized by a stick circuit including front contact 107 of relay LV, front contact 137 of relay 6V1, and front contact 138 of relay 7V1.

Relay 8V1 is picked up in response to the picking up of relay 7V1 by the energization of its lower winding through a circuit including front contacts 110, 111, 112, 123 and 131 of relays CS1, 1V1, 3V1, 5V1, and 7V1, respectively, and back contacts 139 and 140 of relay 9V1. Relay 8V1 when picked up is maintained energized by a stick circuit for its upper winding including front contact 114 of relay LV, front contact 141 of relay 7V1, and front contact 142 of relay 8V1.

Relay 9V1 is picked up in response to the picking up of relay 8V1 by the energization of its lower winding through front contacts 103, 104, 105, 117, 127, and 135 of relays LV, CS1, 2V1, 4V1, 6V1, and 8V1, respectively, and back contacts 143, and 144 of relay 10V1. A stick circuit is established for the energization of the upper winding of relay 9V1 including front contact 107 of relay LV, and front contact 145 of relay 8V1.

Upon the picking up of relay 9V1, the lower winding of relay 10V1 becomes energized through front contacts 110, 111, 112, 123, 131, and 139 of relays CS1, 1V1, 3V1, 5V1, 7V1, and 9V1, respectively. The upper winding of relay 10V1 becomes energized in a stick circuit including front contact 114 of relay LV, front contact 146 of relay 9V1, and front contact 147 of relay 10V1.

Upon the dropping away of the line relay L when the start or conditioning pulse is terminated at the control office as has been described, it opens front contact 91 and deenergizes the oscillator CT1 to initiate the stepping operation. At the same time, the opening of front contact 99 of relay L deenergizes the stick circuit of relay CS1 so that the above described pickup circuits for the stepping relays are opened at front contact 104 for the odd stepper relays and at front contact 110 for the even stepper relays before the oscillator passes through its center position to cause the first step to be taken. The relay LV is maintained picked up until the last step is taken, and thus the above described stick circuits are effective to maintain the entire bank of stepping relays energized immediately following the dropping away of the relay CS1. The relay LV is maintained picked up throughout the cycle by a stick circuit for its upper winding including front contact 107 of relay LV, front contact 148 of relay 10V1, and front contact 149 of relay LV.

It should be noted that there are more stepping relays to be picked up or preset at the field station than there are at the office. For this reason, the conditioning period should be sufficiently long to assure that sufficient time has elapsed for the presetting of all the stepping relays at the field station. Since the length of the conditioning period is determined at the office by the length of time required for the presetting of its stepping relays plus the release time of the relay CS, the stepping relays at the office are made slower in picking up than the stepping relays at the field station; and, in addition, the relay CS is made sufficiently slow releasing by the shorting of its upper winding through front contact 40 so that it does not release until a proper time has elapsed for the conditioning period. The release of this relay CS opens its contact 49 to mark the end of the conditioning period, which is repeated by the line relay L at the field station to effect the initiation of the stepping operation thereat.

The deenergization of the oscillator CT1 by the opening of front contact 91, allows the oscillator to start a free swinging operation for the timing of the stepping relays. Upon rotation through center of the cam 19 of the oscillator CT1, the contact fingers 92 and 93 of the oscillator CT1 become opened, and accordingly relay 1V1 is dropped away as the first step is taken. The stick circuit by which the relay 1V1 has been maintained picked up, dependent upon the oscillator contacts, includes contact fingers 92 and 93 of oscillator CT1, front contacts 150, 151, 152, 153, 122, and 109 of relays 10V1, 8V1, 6V1, 4V1, 2V1, and 1V1, respectively. The other stepping relays are maintained picked up by the energization of stick circuits that have been described.

When the cam 19 of the oscillator CT1 passes through center for the second time during the cycle of operation, relay 2V1 becomes dropped away to mark the beginning of the second step by reason of the opening of a stick circuit for this relay including contact fingers 154 and 155 of oscillator CT1, wire 156, front contacts 157, 158, 159, and 160 of relays 9V1, 7V1, 5V1, and 3V1, respectively, back contact 161 of relay 1V1 connected in multiple with back contact 162 of relay CS1, front contact 116 of relay 2V1, and the upper winding of relay 2V1. The stick circuit that has been effective prior to this time for maintaining the relay 2V1 picked up has been opened at front contact 115 of relay 1V1 when the first step has been taken. Back contact 162 of relay CS1 provides circuit continuity during the crossover time of the contacts of relay 1V1 when that relay drops away.

If a mark is received during the second step as is indicated by the line relay L being maintained picked up at this time, the relay 1V1 becomes picked up during the second step, and when thus picked up is maintained energized until the next cycle of operation of the communication system. The pickup circuit for relay 1V1 under these conditions includes front contact 96 of relay L, contact fingers 94 and 95 of oscillator CT1, wire 97, front contact 98 of relay LV, back contact 163 of relay CS1, front contacts 144, 164, 136, 165, 128, 166, 118, and 167 of relays 10V1, 9V1, 8V1, 7V1, 6V1, 5V1, 4V1, and 3V1, respectively, back contact 106 of relay 2V1, and lower winding of relay 1V1. Relay 1V1 when thus picked up is maintained energized through back contact 102 of relay CS1, back contact 119 of relay 2V1, and front contact 109 of relay 1V1.

For the third step, the relay 3V1 is dropped away when the cam 19 of the oscillator CT1 passes through center for the third time so as to open the contact fingers 92 and 93. The stick circuit for relay 3V1 which is opened at this time includes contact fingers 92 and 93 of oscillator CT1, front contacts 150, 151, 152, and 153 of relays 10V1, 8V1, 6V1, and 4V1 respectively, back contact 122 of relay 2V1, and front contact 120 of relay 3V1. The stick circuit by which relay 3V1 has been energized prior to this time extending through front contact 119 of relay 2V1 has been opened by the taking of the second step just subsequent to the closure of the above described stick circuit including contact fingers 92 and 93 of oscillator CT1.

During the third step, the stepping relay 2V1 is selectively picked up or remains dropped away in accordance with whether a mark or a space is received. Thus, if a mark is received, there is a pickup circuit closed for the relay 2V1 extending through front contacts 96 of relay L, contact fingers 168 and 169 of oscillator CT1, front contacts 170, 171, 140, 172, 132, 173, 124, and 174 of relays LV, 10V1, 9V1, 8V1, 7V1, 6V1, 5V1, and 4V1 respectively, and back contact 113 of relay 3V1. Relay 2V1 when thus picked up is maintained energized by a stick circuit including back contact 175 of relay CS1, back contact 125 of relay 3V1, back contact 162 of relay CS1, front contact 116 of relay 2V1, and upper winding of relay 2V1.

If relay 2V1 is picked up upon the reception of a mark as has been described, the above described stick circuit for relay 1V1 through back contact 119 of relay 2V1 is opened, but, because of relay 3V1 being dropped away at this time, there is a stick circuit closed through back contact 102 of relay CS1, back contact 108 of relay 3V1, front contact 109 of relay 1V1 and upper winding of relay 1V1.

For the fourth step, the relay 4V1 becomes dropped away when the cam 19 of the oscillator CT1 passes through center for the fourth time so as to open the contact fingers 154 and 155. The stick circuit that is opened at this time includes contact fingers 154 and 155 of oscillator CT1, wire 156, front contacts 157, 158, 159 of relays 9V1, 7V1, and 5V1 respectively, back contact 160 of relay 3V1, front contact 126 of relay 4V1 and upper winding of relay 4V1. The stick circuit that has been effective prior to this time for maintaining the relay 4V1 picked up has been opened at front contact 125 of relay 3V1 when the third step has been taken.

If a mark is received during the fourth step as is indicated by the line relay L being maintained picked up at this time, the relay 3V1 becomes picked up during the fourth step, and when thus picked up, is maintained energized until the next cycle of operation of the communication system. The pick up circuit for relay 3V1 under these conditions includes front contact 96 of relay L, contact fingers 94 and 95 of oscillator CT1, wire 97, front contact 98 of relay LV, back contact 163 of relay CS1, front contacts 144, 164, 136, 165, 128, and 166 of relays 10V1, 9V1, 8V1, 7V1, 6V1, and 5V1 respectively, back contact 118 of relay 4V1 and lower winding of relay 3V1. Relay 3V1 when thus picked up is maintained energized through back contact 102 of relay CS1, front contact 119 of relay 2V1 (if relay 2V1 has been picked up), front contact 120 of relay 3V1 and upper winding of relay 3V1. If relay 2V1 is in its dropped away position at this time, the stick energy for 3V1 includes back contact 102 of relay CS1, back contact 129 of relay 4V1, back contact 122 of relay 2V1 connected in multiple with back contact 176 of relay 1V1, front contact 120 of relay 3V1 and upper winding of relay 3V1.

It will be noted that the picking up of relay 3V1 opens the stick circuit last described for relay 1V1 (assuming the relay 2V1 is picked up), but prior to the opening of this circuit a new stick circuit has been closed by the dropping away of relay 4V1. This new stick circuit includes back contact 102 of relay CS1, back contact 129 of relay 4V1, front contact 122 of relay 2V1, front contact 109 of relay 1V1 and upper winding of relay 1V1.

It will be seen by the stick circuits that have been described for relay 1V1 that this relay is maintained energized continuously by respective different stick circuits as the stepping progresses, there always being a stick circuit made up through a back contact of the last relay that has been operated during the stepping. This is assuming that each stepper relay is picked up the second time for registration of a mark. However, if any stepper relay remains dropped away in accordance with the reception of a space, a back contact of that relay closes a stick circuit for preceding relays that is maintained until the start of the next cycle of operation.

In summary, a normally deenergized stepping relay bank is preset or conditioned by energizing all of the stepping relays and then causing their sequential step-by-step deenergization one at a time in turn. This presetting operation is effected by the sequential picking up of these relays after the cycle start relay CS1 and the last step relay has been picked up. During the step-by-step operation in which the relays are sequentially deenergized, circuits are provided so that on any step the next preceding relay can be picked up or not in accordance with the character of the code element for that step. These various pick up and release functions are accomplished by different series of chain stitch type of circuits sometimes termed reiterative networks. As a matter of fact, separate networks of circuits are provided for the odd and the even stepping relays to effect the pick up functions. Also, separate networks of circuits are provided for the odd and the even stepping relays to effect the hold and release functions.

More specifically, the pick up function for the odd numbered stepping relays involves circuits having a series of contacts 105, 117, 127, 135, 143, 106, 167, 118, 166, 128, 165, 136, 164, and 144 (see Fig. 3B). A similar series of circuits is provided for the even stepping relays (see Fig. 3D). When energy is placed on the heel of both contacts 105 and 112, the stepping relays all sequentially pick up to constitute the presetting or preconditioning operation. Obviously, energy can be applied to these contacts only during the conditioning period so that the relays will be free to be sequentially deenergized step-by-step as determined by the timing operation of the oscillator CT1.

During the sequential step-by-step operation, the application of energy to either the heel of contact 98 or the heel of contact 170 during a particular odd or even step which has just then been marked by the release of one of the stepping relays, causes the picking up of the next preceding relay. Either the heel of contact 98 or contact 170 is selected by the position of the oscillator CT1 so as to provide a positive segregation of the successive steps for the existing position of the line relay L. In other words, these series of contacts now being discussed represent a chain circuit arrangement which can be used both for the successive picking up of the relays during presetting or conditioning period, and can be used for the selective picking up of a stepping relay for the registration of a code element.

More specifically, the holding function and the sequential deenergization function is accomplished by stick circuits for the odd numbered stepping relays involving circuits having a series of contacts 119, 122, 129, 153, 137, 152, 145, 151, 148, 150 (see Fig. 3B). A similar series of circuits is also provided for the even stepping relays (see Fig. 3D).

The holding function for the odd numbered stepping relays is by the provision of a selective connection of the stick circuits to a holding bus 327. Similarly, the holding function for the even numbered stepping relays is by the provision of a selective connection of the stick circuits to a holding bus 328. The functioning of the circuits to give a successive deenergization of the stepping relays is accomplished by selectively making the stick circuits dependent upon the existing position of the contacts of the code oscillator CT1.

When the stepping relays are being successively picked up their stick circuits are initially connected to the holding bus 327 or 328 through a front contact of the next preceding relay which has already been picked up, except in the case of the first stepping relay which is a special circuit for reasons presently to be pointed out. These stick circuits are so connected for each particular stepping relay that, upon the release of the next preceding relay, its stick circuit is made dependent upon the position of the oscillator contacts. In this way, the opening of the oscillator contacts for one position can then cause the release of the next stepping relay in the sequence, but the stick circuit for the following stepping relay is made dependent upon the contacts of the oscillator in the other position. For this reason, it is apparent that the first stepping relay needs to have its stick circuit connected during the conditioning period to be dependent upon the existing position of the oscillator contacts, since it is the first one to be released by the operation of the oscillator.

It is readily apparent that a similar series of stick circuits or reiterative network is provided for both the even numbered and the odd numbered stepping relays.

During the operation of the stepping bank, the shifting of these stick circuits from a holding bus to control by the oscillator contacts might involve a momentary opening of the stick circuits, if it were not for additional shunting contacts. For example, the odd numbered stepping relay 3V has its stick circuit shifted between the holding bus 327 and the oscillator contact selecting chain by the contacts 119 and 122. The preceding odd numbered stepping relay 1V1 has back contact 176 which shunts the contact 122 and prevents any interruption of the stick circuit. It can similarly be seen that the contact 177 provides a similar shunt for contact 153. Similar contacts 323 and 324 are provided on stepping relay 2V1 and 4V1 for similar reasons. The symmetry of the circuit organization will indicate that similar contacts are provided for all of the stepping relays both odd and even numbered.

Since the stepping relays after having once been dropped out can selectively be picked up for storing code elements, stick circuits must be provided to hold them independently of the travelling stick circuit which is used during their successive release for the step-by-step operation. This is effected by the use of shunting contacts 108, 121, etc. for the odd numbered stepping relays; and similar contacts 325, 326, etc. for the even numbered stepping relays.

In this way, a stepping relay bank is organized to act both as a stepping organization and as a code storing organization. It is of course understood that these relays of Fig. 3B and Fig. 3D have added contacts which act as the code execution contacts and which have been shown in detail for different functions, such as in Figs. 4, 6, and 8.

*Control of yard signals*

For the capacity of the system as described, wherein eleven steps are provided, the last code element is communicated during the tenth step, during which the relay 9V1 is selectively conditioned in accordance with the character of the code element that is received. The eleventh step is taken by the dropping away of the last step relay LV and this step is reserved for the execution of codes that have been received and stored by the stepper relays during the preceding steps. Thus relay LV is dropped away in accordance with the opening of the contact fingers 92 and 93 of the oscillator CT1 as it rotates through center for the eleventh time during the cycle of operation. The stick circuit that is opened at this time for relay LV includes contact fingers 92 and 93 of oscillator CT1, back contact 150 of relay 10V1, front contact 149 of relay LV and upper winding of relay LV.

Upon the dropping away of the relay LV at the end of the cycle of operation, an indicator lamp in each of the three vertical rows of lamps of the yard indicator signal (see Figs. 1A and 4) is selectively energized in accordance with the particular codes that have been received pertaining to these respective vertical rows of lamps.

The lamps of the left hand vertical row of the signal (see Figs. 1A and 4) are governed, as has been described when considering the transmission of codes, by the elements transmitted during steps 2, 3 and 4, wherein the stepper relays 1V1, 2V1 and 3V1 are selectively energized in accordance with the reception of these elements. Thus, if it has been designated that the head end of the train is to go into track 1, for example, the relays 1V1, 2V1 are picked up and relay 3V1 is deenergized prior to the time of the dropping away of the last step relay LV and it is selected that the lamp 1HK becomes energized to indicate to a trainman the transmitted designation of track 1 for the head end of the train. According to the circuit organization of Fig. 4, the lamps are energized by alternating current supplied by power transformer 178. Thus the lamp 1HK becomes energized upon the dropping away of relay LV, by the output of the transformer 178, through back contact 179 of relay LV, front contact 180 of relay 1V1, front contact 181 of relay 2V1, and back contact 182 of relay 3V1.

If, on the other hand, it is assumed that the button 2HPB (see Fig. 3A) at the yardmasters office has been actuated, the code received during the second, third, and fourth steps is that of "space-mark-mark" which causes the relays 2V1 and 3V1 to be picked up but the relay 1V1 to remain in its dropped away position. Under these conditions, the lamp 2HK becomes energized to indicate that the head of the train is to go into track 2. This lamp is energized through back contact 179 of relay LV, back contact 180 of relay 1V1, front contact 183 of relay 3V1 and front contact 184 of relay 2V1.

Having thus described typical conditions for the selective energization of two indicator lamps in the left hand vertical row of the yard indicator signal of Fig. 1A, it should be readily apparent that if other codes are received, the other indicator lamps are similarly controlled upon reception of their respective assigned codes.

Also, upon the dropping away of the relay LV at the end of the cycle, energy is applied from the power transformer 178 to a selected lamp of the center vertical row in the yard indicator signal in accordance with the code elements received during the 5, 6, and 7 steps respectively. That is, these lamps are selected by the relays 4V1, 5V1 and 6V1 which are used for storing the code elements received during the 5, 6, and 7 respectively.

If the code received is in accordance with the actuation of the button 1RPB (see Fig. 1A) for designation of track 1 for the rear portion of the train, the code transmitted for the energization of a corresponding indicator lamp 1RK (see Fig. 4) is "mark-mark-space." The circuit by which the relay 1RK is energized by the power transformer 178 extends through back contact 185 of relay LV, front contact 186 of relay 4V1, front contact 187 of relay 5V1 and back contact 188 of relay 6V1.

In case the button 2RPB (see Fig. 3A) is actuated for designation of the second track for storage of the rear end of the train, the relays 5V1 and 6V1 are picked up, but relay 4V1 remains deenergized in accordance with the reception of the code "space-mark-mark." Thus, under these conditions, the lamp 2RK of the center vertical row of lamps of the yard indicator signal is energized from the power transformer 178 through back contact 185 of relay LV, back contact 186 of relay 4V1, front contact 189 of relay 6V1, and front contact 190 of relay 5V1.

Having thus described the circuit organization for selectively energizing two of the indicator lamps associated with the indication of tracks for the rear ends of trains, it should be readily apparent that the indicator lamps for the other tracks are similarly controlled with the reception of distinctive codes designed for their control.

If it is assumed that the button 20CPB (see Fig. 3A) has been actuated for designating that a train is to be cut at the 20th car, the relays 7V1 and 8V1 (see Fig. 4) are picked up and relay 9V1 remains dropped away when the stepping is completed because of the reception of the characters "mark-mark-space" during the 8, 9, and 10 steps. Under these conditions, the lamp 20CK is energized upon the dropping away of relay LV from the power transformer 178 through back contact 191 of relay LV, front contact 192 of relay 7V1, front contact 193 of relay 8V1 and back contact 194 of relay 9V1.

If the button 30CPB (see Fig. 3A) is actuated to designate a train to be cut at the 30th car, the code transmitted during the eighth, ninth, and tenth steps is "space-mark-mark," and thus the relays 8V1 and 9V1 of Fig. 4 will be picked up, but the relay 7V1 will remain dropped away. Under these conditions, the lamp 30CK becomes energized upon the dropping away of relay LV at the end of the cycle through back contact 191 of relay LV, back contact 192 of relay 7V1, front contact 195 of relay 9V1, and front contact 196 of relay 8V1.

Having thus described how the designation of the different tracks for a train is effective for setting up corresponding indications in the yard indicator signal, it should be readily apparent that a similar mode of operation is effective by the communication of other distinctive codes to selectively energize the indicator lamps for other tracks.

*Centralized traffic control system*

To illustrate the adaptability of the code communication system as it has been described to centralized traffic control, it will be assumed that the same stepping and decoding circuit organization is provided as is illustrated in Figs. 3A to 3D inclusive, except that the transmitting circuits are energized as is illustrated in Figs. 5A and 5B to provide for the transmission of different switch and signal controls for switches and signals assumed to be located at a remote field station. It will be noted as the description progresses that the mode of operation is substantially the same as that which has been described, but the detail circuits involved in initiation and in the transmissions of codes is modified as is shown in Figs. 5A and 5B.

To consider specifically the circuits involved in transmission during a typical cycle of operation, it will be assumed that an operator of the control machine actuates the switch control lever 1SML to its normal position for operation of the corresponding track switch in the field and that the signal control lever 1SGL is actuated to its right hand position for clearing a signal at the associated field station for governing eastbound traffic. Having thus conditioned the switch and signal control levers, the operator of the control machine depresses the start button 1SPB to initiate the system into a cycle of operation for the communication of codes indicative of the controls that have been designated.

Upon the actuation of the start button 1SPB, the relay 1CH is picked up by the energization of an obvious circuit, and the picking up of this relay, by the closure of front contact 200 causes the picking up of the code determining relay 1LC. The circuit by which the relay 1LC is picked up extends from (+), including back contact 201 of relay LCS, wire 202, back contact 203 of relay 2CH, front contact 200 of relay 1GH, lower winding of relay 1LC, and cancel button CNB, to (−). Upon the picking up of relay 1LC, a stick circuit is closed for the upper winding of this relay, including the winding of relay LCS so that the relay LCS is picked up at this time. This stick circuit extends from (+), including back contacts 204, 205, 206, 207, 208 and 209 of relays 6V, 5V, 4V, 3V, 2V and 1V respectively, winding of relay LCS, wire 210, back contact 211 of relay 2LC, front contact 212 of relay 1LC, and cancel button CNB, to (−).

Relay LCS when picked up causes the picking up of the relay CS2 which corresponds in function to relay CS of Fig. 3A. The pick up circuit for relay CS2 extends from (+), including front contact 213 of relay LCS, front contact 214 of relay LCSP, and lower winding of relay CS2, to (−). The picking up of relay LCS opens an obvious circuit by which the relay LCSP is normally energized at back contact 215, the function of relay LCSP being to open the pick up circuit just described for relay CS2 at front contact 214 when relay CS2 has had time to become picked up and establish its stick circuit. This stick circuit extends from (+), including front contact 213 of relay LCS, back contact 216 of relay 6V, front contact 217 of relay CS2, and lower winding of CS2, to (−). Relay CS2 when picked up closes a stick circuit for relay LCS and relay 1LC to maintain these relays energized during the picking up of the stepping relays. This stick circuit extends from (+), including front contact 218 of relay CS2, front contact 219 of relay LCS, winding of relay LCS, wire 210, back contact 211 of relay 2LC, front contact 212 of relay 1LC, upper winding of relay 1LC and cancel button CNB, to (−). The front contacts 220, 221, 222, 223, 224, and 225 of relays 1V to 6V inclusive apply energy in multiple with front contact 218 of relay CS2 to the stick circuit just described so that this stick circuit remains energized throughout the cycle of operation.

The picking up of relays CS2, by closing its circuit at front contact 226, and at the same time closing the line circuit at front contact 227, provides for the energization of the line relay L (see Fig. 3B), and in turn is effective to energize relay CS1 and oscillator CT1 at the field station by a mode of operation which has been described so as to substantially simultaneously initiate the conditioning at the field station.

In accordance with the picking up of the relays CS2 and CS1 at the office and field stations respectively, the stepping relays become picked up at both stations, and the oscillators at the respective stations become released to initiate the stepping by the same mode of operation that has been described when considering in detail the mode of operation of the yard indicator communication system of Figs. 3A to 3D inclusive.

To consider the transmission of switch and signal control codes, it will be assumed that the line wires 50 and 51 of Fig. 5B are connected to corresponding line wires 50 and 51 of Fig. 3B. Thus, it can be considered that the same receiving apparatus of Figs. 3B and 3D can be used in connection with the reception of switch and signal control codes in a centralized traffic control system as is used in the reception of yard indicator signal codes.

If it is assumed that the relay 1LC has been picked up as has been described, the station code "mark-mark-space" is transmitted during the second, third and fourth steps respectively, a space being always transmitted during the first step for reasons that have been heretofore pointed out.

The second step is a mark because of the line circuit being closed from the positive terminal of the line battery LB, (see Fig. 5B), through back contact 227 of relay CS2, wire 238, jumper 228, front contact 229 of relay 1LC, wire 230, back contact 231 of relay 2V, front contacts 232, 233, 234 and 235 of relays 3V, 4V, 5V, and 6V respectively, contact fingers 236 and 237 of oscillator CT, wire 50, line relay L (see Fig. 3B) and wire 51 to the negative terminal of line battery LB. This circuit that has just been described is opened by the opening of the contact fingers 236 and 237 of oscillator CT at the end of the second step and it cannot again be closed during the cycle because of the opening of front contact 232 of relay 3V when the third step is taken.

A mark is transmitted during the third step in accordance with a circuit being closed from the positive terminal of the line battery LB (see Fig. 5B) through back contact 227 of relay CS2, wire 238, jumper 239, front contact 240 of relay 1LC, wire 241, back contact 242 of relay 3V, front contacts 243, 244, and 245 of relays 4V, 5V and 6V respectively, contact fingers 246 and 247 of oscillator CT, wire 50, winding of relay L (see Fig. 3B) and wire 51 to the negative terminal of the line battery LB. This circuit is opened at the end of the third step by the opening of the contact fingers 246 and 247 of oscillator CT, and the opening of front contact 243 of relay 4V when the fourth step is taken and the subsequent opening of front contact 245 when the sixth step is taken prevents the closure of the circuit just described during the remainder of the cycle of operation.

Because of the transmission of a space being required during this fourth step for the code transmission under consideration, the line circuit is opened during the fourth step in accordance with the positioning of the jumper 248.

If it is assumed that the lever 1SML is in its left hand position, corresponding to the normal position of the associated track switch, the character transmitted during the fifth step is a space because of the transmitting circuit being open at contact 249 of lever 1SML. If, on the other hand, the lever 1SML is in its right hand position, a mark is transmitted during the fifth step because of the line circuit being closed from the positive terminal of the line battery LB, through back contact 227 of relay CS2, wire 238, contact 249 of lever 1SML in its right hand position, front contact 250 of relay 1LC, wire 251, back contact 244 of relay 5V, front contact 245 of relay 6V, contact fingers 246 and 247 of oscillator CT, wire 50, line relay L (see Fig. 3B) and wire 51, to the negative terminal of the line battery LB.

The sixth and seventh steps are assigned for signal control communication and thus if the lever 1SGL is operated to its right hand position, a space is transmitted during the sixth step by reason of the line circuit being opened at contact 252 of lever 1SGL, and a mark is transmitted during seventh step because of the closure of the line circuit from the positive terminal of the line battery LB, through back contact 227 of relay CS2, line wire 238, contact 253 of lever 1SGL in its right hand position, front contact 254 of relay 1LC, wire 255, back contact 256 of relay 1V, front contact 257 of relay 2V, back contact 245 of relay 6V, contact fingers 246 and 247 of oscillator CT, wire 50, winding of relay L (see Fig. 3B) and wire 51, to the negative terminal of the line battery LB.

If the signal control had been transmitted in accordance with the lever 1SGL being operated to its left hand position for designation of the clearing of a westbound signal, a mark would have been transmitted during the sixth step, and a space would have been transmitted during the seventh step. The mark would have been transmitted because of the closure of the line circuit from the positive terminal of the line battery LB, through back contact 227 of relay CS2, wire 238, contact 252 of lever 1SGL in its left hand position, front contact 258 of relay 1LC, wire 259, front contact 260 of relay 1V, back contact 235 of relay 6V, contacts 236 and 237 of oscillator CT, wire 50, line relay L (see Fig. 3B) and wire 51, to the negative terminal of the line battery LB. The space would have been transmitted because of the line circuit being opened during the seventh step at contact 253 of lever 1SGL in its left hand position.

For the transmission of a stop control for the signals governed by the signal control lever 1SGL, lever 1SGL is operated to its center position for this cycle of operation, and in this position the line circuit is maintained open during the sixth and seventh steps at contacts 252 and 253 of lever 1SGL.

Step eight is illustrated as being used for maintainer's call communication purposes, and with the maintainer's call lever 1MCL in its normal position (to the left), a space is transmitted during the eighth step because of the line circuit being opened at contact 261 of lever 1MCL. If, on the other hand, it is desired to call the maintainer, the operation of the lever 1MCL to its right hand position provides that a mark is transmitted during the eighth step of the cycle of operation by reason of the closure of the line circuit from the positive terminal of the line battery LB, through back contact 227 of relay CS2, wire 238, contact 261 of lever 1MCL, front contact 262 of relay 1LC, wire 263, back contact 264 of relay 2V, front contact 265 of relay 3V, back contact 260 of relay 1V, back contact 235 of relay 6V, contact fingers 236 and 237 of oscillator CT, wire 50, line relay L (see Fig. 3B), and wire 51, to the negative terminal of the line battery LB.

Having thus described in detail the mode of operation for the transmission of switch and signal control codes from the control office to a remote field station during a typical cycle of operation, it should be readily apparent that a similar mode of operation is followed for the transmission of other switch and signal controls for other control stations. When the last step is taken, the dropping away of relay 5V deenergizes relay LCS by opening its circuit at front contact 224, and thus the relays LCS and 1LC become dropped away. The restoration to normal conditions of the stepper relays and the oscillators is as has been heretofore described when considering specifically the mode of operation of the apparatus for the communication of yard indicator signal control codes.

The reception of switch and signal control codes at the field location is accomplished by the field stepper relays 1V1 to LV inclusive by the same mode of operation as has been described for the reception of yard signal control codes, the respective stepper relays being picked up for a second time under conditions where a mark is received during the next following step. Upon completion of the stepping, the last step relay LV is dropped away, and the dropping away of this relay executes the codes that have been set up by the positions of the stepper relays.

With reference to Fig. 6, a track layout is illustrated having a single track switch SW. Signals 2A and 2B are provided for governing eastbound traffic and signals 3A and 3B are provided for governing westbound traffic through the track switch SW.

A switch machine SM is provided for the power operation of the track switch SW and a magnetic-stick switch control relay WZ is provided for governing operation of the switch machine SM. Signal control relays RGZ and LGZ are provided at the field location for governing the clearing of signals for eastbound and westbound traffic respectively, a slow acting relay B being provided according to usual practice for the restoration of a signal to stop in accordance with a stop control code transmitted from the control office.

According to Fig. 6, a slow acting repeater relay LVP is energized by the closure of front contact 266 of relay LV, and thus this relay is in its picked up position at the end of a cycle at the time when the relay LV is dropped away. It will, therefore, be readily apparent that a momentary execution period is set up to execute the code during the dropping away time of relay LVP, such execution period being initiated upon the dropping away of relay LV after the code has been received.

If it is assumed that the code received calls for the operation of the track switch SW to its normal position, the relays 1V1 and 2V1 are picked up, and the relays 3V1 and 4V1 are left in their dropped away positions. This is in accordance with the reception of the code characters "mark-mark-space space" as the second, third, fourth and fifth characters of the code respectively. If relay WZ is in its picked up position "corresponding to the reverse switch position of the track," the reception of a normal switch control as has been described causes the relay WZ to be dropped away in accordance with the polarity of energization of the lower winding of this relay by the circuit extending from (+), including back contract 267 of relay LV, front contact 268 of relay LVP, front contact 269 of relay 1V1, front contact 270 of relay 2V1, back contact 271 of relay 3V1, back contact 272 of relay 4V1, front contact 273 of relay WZ, lower winding of relay WZ, back contact 274 of relay RGZ, and back contact 275 of relay LGZ, to (−).

If, on the other hand, the track switch SW is initially in its normal position, and the control transmitted is for operation to its reverse position, the relay WZ is picked up during the execution period by the energization of its upper winding through back contact 267 of relay LV, front contact 268 of relay LVP, front contact 269 of relay 1V1, front contact 270 of relay 2V1, back contact 271 of relay 3V1, front contact 272 of relay 4V1, upper winding of relay WZ, back contact 274 of relay RGZ, and back contact 275 of relay LGZ. It is assumed that the power operation of the track switch SW by the switch machine SM is accomplished in the usual manner in accordance with the condition of the pole changing contacts 276 and 277 of the relay WZ.

The relays 5V1 and 6V1 are conditioned in accordance with the reception of signal control codes, and thus if the signal control code transmitted is for the clearing of an eastbound signal, the characters "space-mark" are transmitted as has been described during the sixth and seventh steps, and thus the relay 5V1 is in its dropped away position, and the relay 6V1 is picked up when execution takes place at the end of a cycle of operation. The circuit for the energization of relay RGZ extends from (+), including back contact 267 of relay LV, front contact 268 of relay LVP, front contact 269 of relay 1V1, front contact 270 of relay 2V1, back contact 271 of relay 3V1, (if the control is for the normal position of track switch SW), back contact 272 of relay 4V1, back contact 279 of relay WZ, back contact 280 of relay 5V1, front contact 281 of relay 6V1, lower winding of relay RGZ, and back contact 282 of relay LGZ, to (−). If the code transmitted calls for the track switch SW to be operated to its reverse position the circuit for the energization of relay RGZ is the same as has been described except that the circuit extends through front contact 272 of relay 4V1, and front contact 283 of relay WZ instead of through back contact 272 of relay 4V1 and back contact 279 of relay WZ. Relay RGZ when picked up is maintained energized according to the usual practice by a stick circuit dependent upon occupancy of the detector track section. Thus the relay RGZ is maintained picked up until the passage of a train by a circuit including back contact 284 of relay B, front contact 285 of relay TR connecting in multiple with back contact 286 of relay TP, front contact 287 of relay RGZ, and upper winding of relay RGZ. The energization of the relay LGZ for governing the clearing of signals for westbound traffic is accomplished by a similar mode of operation to that which has been described for the relay RGZ except that it is responsive to relay 5V1 being picked up and the relay 6V1 being dropped away.

If the signal control received is for restoration of a signal to stop, the relays 5V1 and 6V1 are in their dropped away positions during the execution period, and thus the relay B is momentarily picked up by a circuit including back contacts 288 and 289 of relays 5V1 and 6V1 respectively. Relay B when picked up opens the stick circuits for the relays LGZ and RGZ at back contact 284 so as to cause these relays to be dropped away. It is to be understood that the signals are governed in accordance with the selective closure of front contacts 291 and 292 of relays RGZ and LGZ respectively in accordance with the practice well-known to those familiar with the art.

If the code received at the field station under consideration includes a mark as the eighth character, the relay 7V1 is in its picked up position during the execution period, and thus the maintainer's call relay MC is picked up through front contact 293 of relay 7V1, and the maintainer's call indicator MCK becomes energized in an obvious manner through front contact 294. The maintainer's call relay MC is of the magnetic stick type and thus is maintained picked up until a cycle of operation during which a space is received on the eighth step so as to provide that the relay 7V1 is in its dropped away position during the execution period. This provides that the lower winding of relay MC is energized with a polarity to cause that relay to become dropped away and thus open the circuit for the relay MCK at front contact 294.

*Communication of indications*

To illustrate the adaptability of the code communication system as it has been described for the communication of indications, it will be assumed that the same stepping and decoding circuit organization is provided as is illustrated in Figs. 3A to 3D inclusive, except that the transmitting circuits are selected as is illustrated in Figs. 7A and 7B to provide for the transmission of different indications which may be assumed as being required to be communicated from a given field location to a distant control office. It will be readily apparent as the description progresses that the mode of operation is substantially the same as that which has been described for the communication of other types of controls, except that the detail circuits involved in initiation and in the transmission of codes is modified as is shown in Figs. 7A and 7B.

It is assumed, for the purpose of illustrating one embodiment for communication of indications, that there are more indications to be communicated than can be communicated during one cycle of operation of the communication system, and therefore, a plurality of indication groups, or stations, are set up at a field location, with distinctive registration codes assigned thereto. Thus relays 4CH and 4LC are associated with transmission of indications relative to one indicator station, and relays 5CH and 5LC are provided for use in transmission of indications associated with another indication station.

Relays LCS, LCSP and CS2 of Figs. 7A and 7B will be recognized as having identical control circuits to those shown for corresponding relays in Figs. 5A and 5B which have been heretofore described.

The change relays 4CH and 5CH are maintained normally energized by their respective stick circuits. The stick circuits for relay 4CH include contacts 295, 296, 297 and 298 of the relays 1TR, 2TR, 3TR and 4TR respectively, front contact 299 of relay 4CH and winding of relay 4CH. The contacts 295 to 298 inclusive of the relays 1TR, 2TR, 3TR and 4TR respectively include both front and back fingers in an arrangement so that the stick circuit will be momentarily interrupted upon the shifting of one of these relays to its picked up or dropped away position so as to thereby cause the dropping away of the change relay 4CH so as to initiate the system from its state of rest into a cycle of operation for the communication of indications to the control office. Relay 5CH is similarly governed by the track relays 5TR, 6TR, 7TR, 8TR so as to be effective to intiate the system from its state of rest into a cycle of operation in accordance with a change in the position of either of these relays.

To consider transmission during a typical cycle of operation, it will be assumed that the track relay 1TR has become dropped away, thus causing the dropping away of relay 4CH. The dropping away of this relay causes the picking up of relay 4LC by the energization of a circuit including back contact 300 of relay LCS (see Fig. 7B), wire 301, front contact 302 of relay 5CH, back contact 303 of relay 4CH, and lower winding of relay 4LC. Upon the picking up of this relay a stick circuit is established for its upper winding, including the winding of relay LCS, the same as has been described for similar relays when considering the circuits of Figs. 5A and 5B.

In accordance with the picking up of relay LCS the relay CS2 is picked up for the conditioning of the code communication apparatus according to a mode of operation which has been heretofore described, and the picking up of this relay closes a circuit for the restoration of relay 4CH (see Fig. 7A) to its normally energized position. This circuit includes front contact 304 of relay CS2, wire 305, back contact 306 of relay 5LC, front contact 307 of relay 4LC, and the winding of relay 4CH. It will be noted that this pick up circuit for relay 4CH is a chain circuit in that it includes back contact 306 of relay 5LC so that a CH relay can be restored to its picked up position only when a cycle of communication has been initiated for transmission of indications belonging to the associated station. In other words, if the relays 4CH and 5CH had both been dropped away contemporaneously, a cycle of operation would have been transmitted first to communicate the indications associated with relays 5CH and 5LC, and the relay 4LC could not have been picked up to initiate a cycle of operation until after the first cycle of operation had been completed so as to permit the energization of relay 4LC through front contact 302 of relay 4CH in a chain circuit organization.

The circuit selections for the transmission of the indication station registration code during the second, third, and fourth steps is identical to that which has been described when considering transmission of a control station code with reference to Figs. 5A and 5B, and because of these circuits being identical, corresponding reference characters have been used, and the detail description as it has been set forth relative to the circuits of Figs. 5A and 5B in this respect can be similarly applied to the circuits for transmission indication registration codes according to Figs. 7A and 7B.

If the indication station registration code has been transmitted, the next character communicated is a mark or a space in accordance with whether the track relay 4TR (see Fig. 7A) is respectively dropped away or in its picked up position. If this relay is dropped away, it is determined that the line circuit is closed during the fifth step from the positive terminal of the line battery LB, through back contact 227 of relay CS2, wire 238, back contact 308 of relay 4TR, front contact 309 of relay 4LC, wire 310, back contact 244 of relay 5V, front contact 245 of relay 6V, contact fingers 246 and 247 of oscillator CT, wire 50, line relay L (see Fig. 3B) and line wire 51, to the negative terminal of line battery LB. If the track relay 4TR had been picked up during the cycle of operation, a space would have been transmitted during the sixth step because of the line circuit being opened at back contact 308 of relay 4TR.

Having thus described how a particular code element is selected in accordance with an indication for a particular step, it should be readily apparent that the same mode of operation is effective as the stepping progresses for the communication of indications as to the conditions of the other track relays or other devices to have their conditions indicated at the control office.

The indication codes transmitted are received by the receiving apparatus of Figs. 3B and 3D which is assumed to be located at the control office, and in accordance with the positioning of the stepper relays upon the decoding becoming effective, the track indicator lamps TE (see Fig. 8) are selectively energized to correspond with the indications received for the associated indication stations. The first three characters received are indicative of the indication stations for which the cycle of operation is transmitted, and the registration of such stations at the control office is accomplished by the selective energization of station relays ST. Thus the relay 1ST is picked up in response to the station code "mark-mark-space," and the picking up of this relay renders the control of the relays 1TK to 4TK inclusive effective in accordance with the closure of front contacts 311, 312, 313, and 314 respectively. The circuit by which the relay 1ST is picked up extends from (+), including back contact 317 of relay LV, front contact 318 of relay LVP, front contact 319 of relay 1V1, front contact 320 of relay 2V1, back contact 321 of relay 3V1 and winding of relay 1ST, to (−).

The relays 4V1 to 7V1 inclusive are respectively in their picked up or dropped away positions upon the completion of a cycle of operation for the communication of indications according to the system under consideration, and thus the condition of these relays governs the polarity of energization of the various track indicators TE. Relay 4TK, for example, is energized (when the station relay 1ST is picked up) by negative polarity if back contact 315 of relay 4V1 is closed, or by positive polarity if front contact 315 of relay 4V1 is closed. It is assumed that the closure of back contact 315 of relay 4V1 is indicative of the track being unoccupied and the relay 4TK is actuated by this polarity to its dropped away position so as to open the circuit for the track indicator 4TE at front contact 316. If the relay 4V1 is picked up, the polarity of energization of the relay 4TK is such as to cause that relay to be picked up and to close front contact 316 to provide for the energization of the track indicator lamp 4TE. The other track indicators TK are similarly controlled in accordance with their respective associated channels.

Having thus described three specific embodiments of the present invention, it is desired to be understood that these forms have been described as being typical of numerous embodiments the present invention may assume and it is to be further understood that various adaptations, alterations, and modifications may be applied to the specific forms shown in accordance with the requirements of practice within the scope of the present invention, except as limited by the appending claims.

What we claim is:

1. A normally at rest code communication system for the communication of control codes from a transmitting station to a receiving station comprising in combination, code determining means at the transmitting station for the selection of respective codes for transmission, code transmitting apparatus at the transmitting station effective in response to said code determining means to transmit a selected control code in the form of a succession of selected code elements, code receiving means at the receiving station having a bank of stepping relays operable to picked up and dropped away conditions and operable to count with one relay per step a predetermined number of steps, circuit means effective for distinctively conditioning said stepping relay by selectively actuating or not actuating said relays subsequent to the respective associated steps being taken in accordance with the character of code element received, and signalling means at the receiving station actuated in accordance with the picked up or dropped away condition of said stepping relays after the stepping has been completed upon the reception of a code.

2. A normally at rest code communication system for the communication of selected control codes from a transmitting station to a receiving station during respective cycles of operation comprising in combination, code determining means at the transmitting station for the selection of codes for transmission during the respective cycles of operation of the code communication system, code transmitting apparatus at the transmitting station effective in response to said code determining means to transmit selected control codes in the form of respective selected successions of code elements during respective cycles of operation of the code communication system, code receiving means at the receiving station having a bank of stepping relays operable to picked up and dropped away conditions and operable to count the respective elements of a control code communicated during a cycle of operation of the code communication system, circuit means effective for distinctively conditioning certain of the respective stepping relays by selectively actuating or not actuating said relays subsequent to the respective associated steps being taken in accordance with the character of the respective code elements received, and signalling means at the receiving station subject to actuation in accordance with the picked up or dropped away condition of said stepping relays after all steps have been taken.

3. A normally at rest code communication system for the communication of control codes from a transmitting station to a receiving station comprising in combination, code determining means at the transmitting station for the designation of respective codes for transmission, code transmitting apparatus at the transmitting station including a stepper operable step by step to transmit respective codes in the form of respective successions of selected code elements designated by said code determining means, and code receiving means at the receiving station for decoding the respective codes transmitted by said transmitting apparatus, said code receiving means having a bank of stepping relays operable to picked up and dropped away conditions wherein one relay is provided for each step and the stepping relays are operable step by step to form steps at the same rate as said stepper at the transmitting station, and said stepping relays at the receiving station for certain of the steps being distinctively conditioned by being selectively actuated or not actuated in accordance with the character of the code element received during the respective following steps, and signalling apparatus distinctively actuated upon completion of the operation of said stepping relays in accordance with the picked up or dropped away condition of said stepping relays after the stepping has been completed.

4. A code communication system connecting a transmitting and a receiving station for governing the operation of a device at the receiving station comprising in combination, manually operable means at the transmitting station for selectively designating different control codes for transmission, normally at rest code communication apparatus including a line circuit connecting the transmitting and receiving stations, said code communication apparatus being rendered active by the actuation of said manually operable means to transmit a control code comprising a succession of code elements selected in accordance with the particular selective condition of the manually operable means, said code communication apparatus at the receiving station having a stepping relay bank operable in response to the initiation of transmission over the line circuit to actuate its stepping relays consecutively at a predetermined rate to form respective receiving steps, and said code communication apparatus at the receiving station having circuit means operable selectively to actuate or not actuate each of several of said stepping relays for a second time during a cycle of operation in accordance with the code character transmitted over said line circuit during the following step, means for maintaining said stepping relays in their second actuated positions until the stepping has been completed, and circuit means rendered effective in response to the stepping having been completed to distinctively govern said device in accordance with the condition of said stepping relays.

5. A code communication system for the communication of control codes from a transmitting station for governing the operation of a device at a receiving station comprising in combination, manually operable means at the transmitting station for selectively designating definite control codes for transmission and for initiating the system into respective cycles of operation, normally at rest code communication apparatus including a line circuit connecting the transmitting and receiving stations, said code communication apparatus being rendered active by the actuation of said manually operable means to transmit a control code comprising a succession of code elements selected in accordance with the particular selective condition of said manually operable means, said code communication apparatus at the receiving station comprising a stepping relay bank having relays operable to picked up and dropped away conditions respectively, circuit means for energizing each of said stepping relays at the beginning of a cycle of operation of the code communication system and deenergizing the relays successively at a predetermined rate to form the respective steps, decoding means including several of the stepping relays effective to energize each of said several stepping relays during the respective following steps only provided a particular character is received over the line circuit during that following step, stick circuit means for maintaining said several stepping relays energized subsequent to their energization by said decoding means until the stepping has been completed, and circuit means rendered effective after the stepping is completed to distinctively govern said device in accordance with the picked up or dropped away condition of said stepping relays.

6. A normally at rest code communication system connecting a transmitting and a receiving station for governing the operation of a device at the receiving station comprising in combination, manually operable means at the transmitting station for selectively designating definite codes for transmission and for initiating transmission of a selected code, line circuit means connecting the transmitting and receiving stations, code transmitting means at the transmitting station operable in response to initiation of the system into a cycle of operation by said manually operable means to transmit a selected control code comprising a succession of code elements over the line circuit, a normally deenergized oscillatory timing device at the receiving station having a torsional pendulum, said timing device having an electromagnet effective when energized to rotate the pendulum to an extreme position, and said timing device being effective when energization is removed from its electromagnet to operate through a number of free oscillations of the pendulum, a bank of stepping relays at the receiving station operable to picked up and dropped away conditions and operable sequentially to form respective steps in response to respective free oscillations of said timing device, decoding means at the receiving station effective to actuate several of said stepping relays for a second time during the respective steps following their associated steps only provided that a predetermined code character is received over said line circuit at that time, and means for governing said device in accordance with the picked up or dropped away condition of said stepping relays at the receiving station at the end of a cycle of operation of the code communication system.

7. A normally at rest code communication system connecting a transmitting and a receiving station for governing the operation of a device at the receiving station comprising in combination, manually operable means at the transmitting station for selectively designating different codes for transmission and for initiating the system into a cycle of operation, line circuit means connecting the transmitting and receiving stations, code transmitting means at the transmitting station responsive to said manually operable means for transmitting a selected series of successive code characters over said line circuit during a cycle of operation, a normally deenergized oscillatory timing device at the receiving station having a torsional pendulum, said timing device having an electromagnet effective when energized to rotate the pendulum to an extreme position, and said timing device being effective upon deenergization to operate through a number of free oscillations, a bank of stepping relays at the receiving station operable to picked up and dropped away conditions respectively, circuit means for momentarily energizing all of said stepping relays upon the energization of the electromagnet of said timing device, and for deenergizing the stepping relays sequentially to form respective steps in response to the respective free oscillations of the timing device, said circuit means being effective to reenergize each of several of said stepping relays during the next step following the respective associated steps only provided a particular code character is received over the line circuit during that following step, stick circuit means for maintaining said several stepping relays energized subsequent to their reenergization until the stepping has been completed, and circuit means rendered effective after the stepping is completed to distinctively govern said device in accordance with the picked up or dropped away condition of said stepping relays.

8. A normally at rest code communication system connecting a transmitting and a receiving station for governing the operation of a device at the receiving station comprising in combination, manually operable means at the transmitting station for selectively designating different codes for transmission and effective when actuated to initiating transmission of a selected code, line circuit means connecting the transmitting and receiving stations, a normally deenergized oscillatory timing device at each station having a torsional pendulum, said timing device having an electromagnet effective when energized to rotate the pendulum to an extreme position, and said timing device being effective upon deenergization to operate through a number of free oscillations, circuit means responsive to said manually operable means for momentarily energizing the electromagnet of said timing device at each station, a bank of stepping relays at each station operable to picked up and dropped away conditions and operable subsequentially to form respective steps in response to the respective free oscillations of the timing device at the associated station, code transmitting means at the transmitting station including contacts of the timing device and of the stepping relays and of said manually operable means at the transmitting station for transmitting a selected series of successive code characters over said line circuit, code receiving means at the receiving station including said stepping relays at the receiving station distinctively responsive to codes received over the line circuit, said code receiving means being effective to actuate several of said stepping relays at the receiving station for a second time during the steps following their respective associated steps only provided that a predetermined code character is received over said line circuit at that time, and means for governing said device in accordance with the picked up or dropped away condition of said stepping relays at the receiving station at the end of a cycle of operation of the code communication system.

9. A code communication system for the communication of control codes from a transmitting station to a receiving station at a multiple track railway yard for selectively governing multiple aspects of a yard indicator signal at the receiving station comprising in combination, manually operable means at the transmitting station having several buttons for designation of respective track destinations for trains, each of said buttons being locked in its actuated position until another button is actuated, normally at rest code communication apparatus including a line circuit connecting the transmitting and receiving stations, said code communication apparatus being rendered active by the actuation of said manually operable means to transmit a control code comprising successive elements selected by the particular one of said buttons that is locked in its actuated position, said code communication apparatus at the receiving station comprising a stepping relay bank having relays for respective steps operable to picked up and dropped away conditions, said stepping relay bank being operable in response to the initiation of transmission over the line circuit to actuate the stepping relays consecutively at a predetermined rate to form respective receiving steps, said stepping relay bank having circuit means selectively governed to actuate or not actuate each of several of said stepping relays for a second time during the cycle of operation in accordance with the code character transmitted over said line circuit during the next following step, said stepping relays having stick circuit means for maintaining these relays in their second actuated positions until the next cycle of operation of the communication system, and circuit means rendered effective at the receiving station except when said communication system is in a cycle of operation to govern the aspect displayed by said signal in accordance with the picked up or dropped away condition of said stepping relays at that station.

10. A yard indicator control system connecting a transmitting station and a field station at a multiple track railway yard comprising in combination, a yard signal having a distinctive aspect for each of the tracks of the yard, manually operable means at the transmitting station having buttons for designation of the respective tracks, each of said buttons being locked in its actuated position until another button is actuated, said manually operable means being operable to initiate the system into a cycle of operation, normally at rest code communication apparatus including a line circuit connecting the transmitting and receiving stations, said code communication apparatus being rendered active by the actuation of said manually operable means to transmit a control code comprising successive elements selected by the particular one of said buttons that is locked in its actuated position, said code communication apparatus at the receiving station comprising a stepping relay bank having a relay for each step, circuit means for energizing each of said stepping relays at the beginning of a cycle of operation of the code communication system and deenergizing the stepping relays successively at a predetermined rate to form the respective steps, decoding circuit means including several of said stepping relays effective to energize each of said several stepping relays during the respective following steps only provided a particular code character is received over the line circuit during such following step, stick circuit means for maintaining said stepping relays energized subsequent to their energization by said decoding means until the next cycle of operation of the code communication system, and circuit means for governing the display of the aspects of said signal in accordance with the respective combinations of the respective stepping relays that are in their energized positions when the system is at rest.

11. Code receiving means for a multiple element code comprising successive elements in a normally at rest code communication system in which a start code element is transmitted at the beginning of each cycle of operation, said receiving means comprising a stepping relay bank having a relay for each step to be taken, circuit means for energizing each of said stepping relays in response to the reception of a start code element and for deenergizing said stepping relays successively step-by-step at a predetermined rate until all of the stepping relays have been deenergized, circuit means governed by the reception of the code elements for the different steps to actuate or not actuate each of the several stepping relays for a second time during the cycle of operation in accordance with the characters of the code elements for the respective steps, stick circuit means for maintaining energized those relays which may be actuated the second time until the next ensuing cycle of operation, and circuit means rendered effective when said stepping relay bank has completed a cycle of operation to distinctively control other electroresponsive means.

12. Code receiving means for a multiple element successive code type communication system comprising, a timing device operable through a number of free swinging oscillations when released for operation at the beginning of a cycle of operation, a bank of stepping relays, circuit means controlled by the free swinging operation of said timing device for causing said stepping relays to operate successively step-by-step through a complete cycle of operation of the stepping relays irrespective of the code characters being received, circuit means effective on each step to selectively position the preceding stepping relay in accordance with the character of the code element then being received, and electroresponsive means governed by the different selected positions of said stepping relays at the end of a cycle of operation.

13. Code receiving means for a multiple element code comprising successive code elements in a normally at rest code communication system in which a start code element is transmitted at the beginning of each cycle of operation, said receiving means comprising, a stepping relay bank having stepping relays for the respective steps operable to picked up and dropped away conditions, said stepping relays being normally deenergized, circuit means for energizing each of said stepping relays at the beginning of a cycle of operation in response to the start code element and then successively deenergizing such stepping relays at a rate corresponding to the rate of reception of successive code elements, circuit means effective on each step upon the deenergization of the stepping relay for that step to selectively energize or leave deenergized the next preceding relay in accordance with the character of the code element then being received, stick circuit means for maintaining those of said stepping relays selectively energized by code elements until the next cycle of operation of said stepping relay bank, and electroresponsive means distinctively controlled in accordance with the different distinctive picked up or dropped away conditions of said stepping relays of the bank at the end of the cycle of operation.

14. In a normally at rest code communication system for transmitting successive code elements from a sending station to a receiving station over a communication channel, a normally deenergized oscillatory timing device at each station having a torsional type pendulum biased by a spring to a midposition, said timing device also having different contacts respectively operated when said pendulum swings to opposite sides of its mid-position, said timing device having an electromagnet effective when energized to operate said pendulum from a normal mid-position to a starting position beyond its extreme oscillatory position, a bank of normally deenergized stepping relays at each station, designating means for designating a code for transmission, circuit means at the sending station rendered active when in response to said designating means for causing the temporary energization of said timing device at that station and also causing the energization of the relays of the associated stepping relay bank, said circuit means at the same time sending a start code element over said communication channel to the other station, circuit means at the receiving station responsive to said start code element for causing the temporary energization of said timing device at that station and also causing the energization of the relays of the associated stepping relay bank, circuit means at each station effective at the end of said start code element to deenergize its respective one of said timing devices, and circuit means at each station controlled by the contacts of said timing device at that station for successively deenergizing the associated stepping relays to form respective steps, transmitting means at the sending station for transmitting over the communication channel a distinctive code element on each step of the associated stepping relay bank, and receiving means at the receiving station distinctively responsive to the character of the code elements received over the communication channel for the respective steps.

15. Code receiving means for a multiple element code comprising successive elements in a normally at rest code communication system in which a start code element is transmitted at the beginning of each cycle of operation, said receiving means comprising a stepping relay bank having a plurality of stepping relays operable to picked up and dropped away conditions and being provided one for each step to be taken, circuit means for energizing the relays of said stepping relay bank in response to the reception of the start code element and for deenergizing said stepping relays successively step-by-step through a cycle of operation, circuit means governed by the reception of the code elements for the different steps to actuate or not actuate certain of the several stepping relays for a second time during the cycle of operation in accordance with the characters of the code elements for their respective steps, circuit means for maintaining said stepping relays in the positions to which they are actuated during their second operation until the next ensuing cycle of operation, a plurality of magnetic stick type relays corresponding respectively to certain steps that may be operated for the second time, and circuit means momentarily effective at the end of a cycle of operation to cause the energization of each of said magnetic stick relays with current of a polarity selected in accordance with the picked up or dropped away condition of its corresponding stepping relay.

16. Code transmitting means for a normally at rest multiple element successive code type communication system comprising, a normally deenergized timing device operable through a number of free swinging oscillations upon deenergization at the beginning of a cycle, a stepping relay bank having a stepping relay for each step and all of said relays being normally deenergized, designating means for designating a code for transmission, circuit means rendered active in response to said designating means for causing the temporary energization of said timing device and also causing the sequential energization of the associated stepping relays, circuit means effective when all of said stepping relays have been energized to cause the deenergization of said timing device, circuit means controlled by the contacts of said timing device for successively deenergizing the associated stepping relays to form respective steps, and means controlled on each step in accordance with the position of a code determining contact for causing the transmission of a characteristic code element over a communication channel.

17. In a normally at rest code communication system for the transmission of switch and signal control codes from a transmitting station to a receiving station comprising in combination, code determining means at the transmitting station including a plurality of switch and signal control levers for the selection of different codes for transmission, code transmitting apparatus at the transmitting station effective in response to the manual designation of a particular control code to transmit a plurality of distinctive successive code elements to the receiving station over a communication channel, code receiving means at the receiving station responsive to the code elements on the communication channel and including a bank of stepping relays operable to picked up and dropped away conditions and operable successively step-by-step one relay for each step to constitute a cycle of operation having a predetermined number of steps, decoding circuit means effective for distinctively conditioning by selectively actuating or not actuating said stepping relay preceding the stepping relay then acting to count any particular step, said distinctive conditioning being in accordance with the character of the code element being received for that step over said communication channel, and switches and signals at the receiving station controlled in accordance with the picked up or dropped away condition of said stepping relays after said stepping relays have completed a cycle of operation.

18. In a normally at rest code communication system for the transmission of indication codes by successive code elements from an outlying field station to a central office comprising in combination, code determining means at the field station including a plurality of indication contacts certain ones of which are positioned in accordance with the occupied or unoccupied condition of associated track sections, said indication contacts acting to select the particular code characters to be successively transmitted, code transmitting apparatus initiated in response to a change in the condition of said indication contacts and effective to transmit a selected indication code comprising a succession of selected code elements, code receiving means at the receiving station including a timing device operable through a number of free swinging oscillations when released for operation at the beginning of a code, a bank of stepping relays operable to picked up and dropped away condition, circuit means controlled by the free swinging operation of said timing device for causing said stepping relays to operate successively step-by-step to complete a cycle of operation, decoding circuit means effective on each step of said stepping bank to selectively condition by actuation or not actuating the preceding stepping relay in accordance with the character of the code element then being received, and a plurality of indication devices governed at the end of each cycle of operation by the different picked up or dropped away conditions of said stepping relays establishedlished by said decoding means during that cycle of operation.

19. Code receiving means for a multiple element successive code type communication system comprising, a bank of stepping relays operable one for each step through a succession of steps for the respective code elements received, decoding circuit means effective for distinctively conditioning by actuating or not actuating a stepping relay for each code element when it precedes the stepping relay having just taken a step for that code element in accordance with the character of the element, and circuit means controlled by the distinctive positions of said stepping relays following a completed stepping operation for controlling electroresponsive means in accordance with the code elements received.

References Cited in the file of this patent

UNITED STATES PATENTS

| | | |
|---|---|---|
| 1,858,876 | Bossart | May 17, 1932 |
| 2,170,129 | DeLong | Aug. 22, 1939 |
| 2,194,352 | Brixner et al. | Mar. 19, 1940 |
| 2,194,353 | Brown et al. | Mar. 19, 1940 |
| 2,197,416 | Place | Apr. 16, 1940 |
| 2,292,245 | Snavely et al. | Aug. 4, 1942 |
| 2,302,006 | Coley | Nov. 17, 1942 |
| 2,351,588 | Field | June 20, 1944 |
| 2,626,314 | Coley | Jan. 20, 1953 |
| 2,626,383 | Coley | Jan. 20, 1953 |

UNITED STATES PATENT OFFICE
CERTIFICATE OF CORRECTION

Patent No. 2,868,962 January 13, 1959

Nelson B. Coley et al.

It is hereby certified that error appears in the printed specification of the above numbered patent requiring correction and that the said Letters Patent should read as corrected below.

Column 29, line 68, after "active" strike out "when"; column 32, line 1, for "actuation" read -- actuating --.

Signed and sealed this 25th day of August 1959.

(SEAL)

Attest:

KARL H. AXLINE

Attesting Officer

ROBERT C. WATSON

Commissioner of Patents